(12) United States Patent
Mills

(10) Patent No.: US 8,739,512 B2
(45) Date of Patent: Jun. 3, 2014

(54) COMBINED CYCLE POWER PLANT

(75) Inventor: David R. Mills, Palo Alto, CA (US)

(73) Assignee: Areva Solar, Inc., Mountain View, CA (US)

( * ) Notice: Subject to any disclaimer, the term of this patent is extended or adjusted under 35 U.S.C. 154(b) by 725 days.

(21) Appl. No.: 12/157,067

(22) Filed: Jun. 6, 2008

(65) Prior Publication Data

US 2009/0121495 A1    May 14, 2009

Related U.S. Application Data

(60) Provisional application No. 60/933,619, filed on Jun. 6, 2007.

(51) Int. Cl.
*B60K 16/00*    (2006.01)
*F02C 7/00*    (2006.01)

(52) U.S. Cl.
USPC ............................ 60/39.5; 60/203.1; 60/641.8

(58) Field of Classification Search
USPC .................. 60/659, 727, 39.182, 39.5, 203.1, 60/641.8, 641.15, 641.14
See application file for complete search history.

(56) References Cited

U.S. PATENT DOCUMENTS

| | | | |
|---|---|---|---|
| 787,145 A | 4/1905 | Brown | |
| 1,174,602 A | 3/1916 | Naylor | |
| 1,240,890 A | 9/1917 | Shuman et al. | |
| 2,106,346 A * | 1/1938 | Gleichmann et al. | 60/652 |
| 2,291,534 A | 7/1942 | Deppe | |
| 2,298,663 A * | 10/1942 | Walter Traupel | 60/39.17 |
| 2,793,018 A | 5/1957 | Trombe | |
| 2,846,724 A | 8/1958 | Aylwin | |
| 3,026,858 A | 3/1962 | Fleischer | |
| 3,064,418 A | 11/1962 | Sanders | |
| 3,206,858 A | 9/1965 | Fleischer | |
| 3,311,458 A | 3/1967 | Schunemann | |
| 3,464,885 A | 9/1969 | Land et al. | |
| 3,466,119 A | 9/1969 | Francia | |
| 3,577,733 A * | 5/1971 | Manuel et al. | 60/646 |

(Continued)

FOREIGN PATENT DOCUMENTS

| | | |
|---|---|---|
| BE | 1013565 A3 | 4/2002 |
| CN | 1075589 C | 11/2001 |

(Continued)

OTHER PUBLICATIONS

Abengoa Solar. (Date Unknown, Web Document Created Feb. 25, 2008). "Solutions to Global Climate Change," located at <http://www.abengoasolar.com/corp/export/sites/solar/resources/pdf/Sevilla_PV.pdf, last visited on Aug. 17, 2010, fourteen pages.

(Continued)

*Primary Examiner* — Andrew Nguyen
(74) *Attorney, Agent, or Firm* — Morrison & Foerster LLP

(57) ABSTRACT

Combined cycle power plants and related methods are disclosed here. In the plants, a mediating thermal energy storage unit is used to store waste or residual thermal energy recovered from a heat engine employing a top thermodynamic cycle of the combined cycle power plant, so that the stored residual thermal energy may be used as an energy source in a bottom thermodynamic cycle of the power plant. In the combined cycle power plants described here, the heat engine employing a top cycle may comprise a Brayton cycle heat engine and the heat engine employing the bottom thermodynamic cycle may be a Rankine cycle heat engine.

39 Claims, 3 Drawing Sheets

(56) References Cited

U.S. PATENT DOCUMENTS

| | | | |
|---|---|---|---|
| 3,861,379 | A | 1/1975 | Anderson, Jr. |
| 3,884,217 | A | 5/1975 | Wartes |
| 3,892,433 | A | 7/1975 | Blake |
| 3,920,413 | A | 11/1975 | Lowery |
| 3,956,030 | A | 5/1976 | Lee et al. |
| 3,986,021 | A | 10/1976 | Hitchcock |
| 3,995,429 | A | 12/1976 | Peters |
| 4,000,851 | A | 1/1977 | Heilemann |
| 4,022,184 | A | 5/1977 | Anderson |
| 4,033,118 | A | 7/1977 | Powell |
| 4,038,557 | A * | 7/1977 | Gildersleeve et al. ......... 290/1 R |
| 4,054,246 | A | 10/1977 | Johnson |
| 4,056,313 | A | 11/1977 | Arbogast |
| 4,069,674 | A | 1/1978 | Warren |
| 4,081,966 | A | 4/1978 | deGeus |
| 4,088,120 | A | 5/1978 | Anderson |
| 4,091,622 | A | 5/1978 | Marchesi |
| 4,094,148 | A * | 6/1978 | Nelson ........................... 60/652 |
| 4,106,485 | A | 8/1978 | Polley |
| 4,108,154 | A | 8/1978 | Nelson |
| 4,111,184 | A | 9/1978 | Perkins |
| 4,117,682 | A | 10/1978 | Smith |
| 4,122,833 | A | 10/1978 | Lovelace et al. |
| 4,124,061 | A | 11/1978 | Mitchell et al. |
| 4,136,671 | A | 1/1979 | Whiteford |
| 4,138,995 | A | 2/1979 | Yuan |
| 4,141,626 | A | 2/1979 | Treytl et al. |
| 4,144,716 | A | 3/1979 | Chromie |
| 4,148,300 | A | 4/1979 | Kaufman, Sr. |
| 4,149,523 | A | 4/1979 | Boy-Marcotte et al. |
| 4,157,290 | A | 6/1979 | Ladislav et al. |
| 4,159,710 | A | 7/1979 | Prast |
| 4,177,325 | A | 12/1979 | Roberts et al. |
| 4,184,477 | A | 1/1980 | Yuan |
| 4,203,426 | A | 5/1980 | Matlock et al. |
| 4,210,201 | A | 7/1980 | O'Hanlon |
| 4,210,463 | A | 7/1980 | Escher |
| 4,210,643 | A | 7/1980 | Fleisch et al. |
| 4,215,553 | A | 8/1980 | Poirier et al. |
| 4,220,140 | A | 9/1980 | Francia |
| 4,229,076 | A | 10/1980 | Chromie |
| 4,238,265 | A | 12/1980 | Deminet |
| 4,239,344 | A | 12/1980 | Wildenrotter |
| 4,243,018 | A | 1/1981 | Hubbard |
| 4,263,895 | A | 4/1981 | Colao |
| 4,265,224 | A | 5/1981 | Meyer |
| 4,267,881 | A | 5/1981 | Byerly |
| 4,268,332 | A | 5/1981 | Winders |
| 4,276,440 | A | 6/1981 | Cannelli |
| 4,281,640 | A | 8/1981 | Wells |
| 4,289,115 | A | 9/1981 | O'Hanlon |
| 4,291,677 | A | 9/1981 | Monk |
| 4,304,221 | A | 12/1981 | Trihey |
| 4,312,324 | A | 1/1982 | Ross et al. |
| 4,318,393 | A | 3/1982 | Goldstein |
| 4,333,447 | A | 6/1982 | Lemrow et al. |
| 4,337,827 | A | 7/1982 | Jabsen |
| 4,339,484 | A | 7/1982 | Harding |
| 4,348,135 | A | 9/1982 | St. Clair |
| 4,375,806 | A | 3/1983 | Nishman |
| 4,384,135 | A | 5/1983 | Cartwright et al. |
| 4,385,430 | A | 5/1983 | Bartels |
| 4,388,966 | A | 6/1983 | Speigel |
| 4,389,464 | A | 6/1983 | Muhlratzer |
| 4,394,859 | A | 7/1983 | Drost |
| 4,402,306 | A | 9/1983 | McElroy, Jr. |
| 4,405,010 | A | 9/1983 | Schwartz |
| 4,414,812 | A | 11/1983 | Parry |
| 4,416,264 | A | 11/1983 | Herrick et al. |
| 4,422,893 | A | 12/1983 | Duchateau et al. |
| 4,434,785 | A | 3/1984 | Knudsen et al. |
| 4,435,043 | A | 3/1984 | Mertens et al. |
| 4,436,373 | A | 3/1984 | Kirsch |
| 4,441,318 | A | 4/1984 | Theckston |
| 4,445,499 | A | 5/1984 | Platell |
| 4,454,371 | A | 6/1984 | Folino |
| 4,459,972 | A | 7/1984 | Moore |
| 4,462,391 | A | 7/1984 | Laussermair et al. |
| 4,468,848 | A | 9/1984 | Anderson et al. |
| 4,496,787 | A | 1/1985 | Touchais et al. |
| 4,505,260 | A | 3/1985 | Metzger |
| 4,511,756 | A | 4/1985 | Moeller et al. |
| 4,515,148 | A | 5/1985 | Boy-Marcotte et al. |
| 4,520,794 | A | 6/1985 | Stark et al. |
| 4,526,005 | A | 7/1985 | Laing et al. |
| 4,553,531 | A | 11/1985 | Rosende |
| 4,559,926 | A | 12/1985 | Butler |
| 4,586,489 | A | 5/1986 | Voll et al. |
| 4,628,905 | A | 12/1986 | Mills |
| 4,643,212 | A | 2/1987 | Rothrock |
| 4,676,068 | A | 6/1987 | Funk |
| 4,683,872 | A | 8/1987 | Fricker |
| 4,706,651 | A | 11/1987 | Yudow |
| 4,727,930 | A | 3/1988 | Bruckner et al. |
| 4,730,602 | A | 3/1988 | Posnansky et al. |
| 4,738,304 | A | 4/1988 | Chalmers et al. |
| 4,815,433 | A | 3/1989 | Wild |
| 4,815,443 | A | 3/1989 | Vrolyk et al. |
| 4,820,033 | A | 4/1989 | Sick |
| 4,820,395 | A | 4/1989 | Angelini |
| 4,890,599 | A | 1/1990 | Eiden |
| 5,113,659 | A | 5/1992 | Baker et al. |
| 5,128,115 | A | 7/1992 | Glatzmaier |
| 5,138,832 | A | 8/1992 | Paude |
| 5,272,879 | A | 12/1993 | Wiggs |
| 5,275,150 | A | 1/1994 | Lai |
| 5,417,052 | A * | 5/1995 | Bharathan et al. ............... 60/783 |
| 5,448,889 | A | 9/1995 | Bronicki |
| 5,523,132 | A | 6/1996 | Zhang et al. |
| 5,542,409 | A | 8/1996 | Sampayo |
| 5,578,140 | A | 11/1996 | Yogev et al. |
| 5,643,423 | A | 7/1997 | Kimock et al. |
| 5,649,416 | A * | 7/1997 | Moore ......................... 60/39.15 |
| 5,860,414 | A | 1/1999 | Steinmann |
| 5,862,799 | A | 1/1999 | Yogev et al. |
| 5,899,199 | A | 5/1999 | Mills |
| 5,931,158 | A | 8/1999 | Buck |
| 5,994,681 | A | 11/1999 | Lloyd |
| 6,000,211 | A | 12/1999 | Bellac et al. |
| 6,003,508 | A | 12/1999 | Hoffschmidt et al. |
| 6,035,850 | A | 3/2000 | Deidewig et al. |
| 6,065,284 | A | 5/2000 | Horner et al. |
| 6,066,187 | A | 5/2000 | Jensen et al. |
| 6,131,565 | A | 10/2000 | Mills |
| 6,141,949 | A | 11/2000 | Steinmann |
| 6,177,131 | B1 | 1/2001 | Glaubitt et al. |
| 6,212,873 | B1 * | 4/2001 | Sugishita et al. .......... 60/39.182 |
| 6,227,280 | B1 | 5/2001 | Wirth et al. |
| 6,234,166 | B1 | 5/2001 | Katsir et al. |
| 6,279,312 | B1 | 8/2001 | Hennecke |
| 6,290,185 | B1 | 9/2001 | DeMars et al. |
| 6,344,272 | B1 | 2/2002 | Oldenburg et al. |
| 6,349,718 | B1 | 2/2002 | Ven et al. |
| 6,484,506 | B1 | 11/2002 | Bellac et al. |
| 6,530,369 | B1 | 3/2003 | Yogev et al. |
| 6,543,441 | B2 | 4/2003 | Fünger et al. |
| 6,594,984 | B1 | 7/2003 | Kudija, Jr. et al. |
| 6,632,542 | B1 | 10/2003 | Mahoney et al. |
| 6,668,555 | B1 | 12/2003 | Moriarty |
| 6,668,820 | B2 | 12/2003 | Cohen et al. |
| 6,742,325 | B2 | 6/2004 | Kudija, Jr. et al. |
| 6,752,434 | B2 | 6/2004 | Cummins |
| 6,783,653 | B2 | 8/2004 | Mahoney et al. |
| 6,906,842 | B2 | 6/2005 | Agrawal et al. |
| 6,941,759 | B2 | 9/2005 | Bellac et al. |
| 6,957,536 | B2 | 10/2005 | Litwin et al. |
| 6,959,993 | B2 | 11/2005 | Gross et al. |
| 6,971,756 | B2 | 12/2005 | Vasylyev et al. |
| 6,994,082 | B2 | 2/2006 | Hochberg et al. |
| 7,041,342 | B2 | 5/2006 | Lohmeyer et al. |
| 7,051,529 | B2 | 5/2006 | Murphy et al. |
| 7,055,519 | B2 | 6/2006 | Litwin |
| 7,140,181 | B1 | 11/2006 | Jensen et al. |
| 7,156,088 | B2 | 1/2007 | Luconi |

(56) References Cited

U.S. PATENT DOCUMENTS

| | | | |
|---|---|---|---|
| 7,191,597 B2 | 3/2007 | Goldman | |
| 7,192,146 B2 | 3/2007 | Gross et al. | |
| 7,207,327 B2 | 4/2007 | Litwin et al. | |
| 7,296,401 B2 | 11/2007 | Asanuma et al. | |
| 7,296,410 B2 | 11/2007 | Litwin | |
| 7,299,633 B2 | 11/2007 | Murphy et al. | |
| 7,395,820 B2 | 7/2008 | Kuckelkorn | |
| 7,412,976 B2 | 8/2008 | Winston | |
| 7,432,488 B1 | 10/2008 | Hines et al. | |
| 7,479,350 B1 | 1/2009 | Neumann et al. | |
| 7,608,938 B2 * | 10/2009 | Andrew et al. | 290/52 |
| 7,614,397 B1 | 11/2009 | Munson, Jr. | |
| 7,961,835 B2 * | 6/2011 | Keller | 376/317 |
| 2002/0078945 A1 | 6/2002 | Funger et al. | |
| 2003/0131583 A1 | 7/2003 | Kudija, Jr. et al. | |
| 2003/0137754 A1 | 7/2003 | Vasylyev et al. | |
| 2003/0173469 A1 | 9/2003 | Kudija, Jr. et al. | |
| 2004/0004175 A1 | 1/2004 | Nakamura | |
| 2004/0074490 A1 | 4/2004 | Mills et al. | |
| 2004/0163697 A1 | 8/2004 | Papadopoulos | |
| 2004/0231716 A1 | 11/2004 | Litwin | |
| 2004/0261788 A1 | 12/2004 | Winston | |
| 2005/0126170 A1 | 6/2005 | Litwin | |
| 2005/0126171 A1 * | 6/2005 | Lasker | 60/645 |
| 2005/0126560 A1 | 6/2005 | Litwin | |
| 2005/0150225 A1 | 7/2005 | Gwiazda et al. | |
| 2005/0189525 A1 | 9/2005 | Kuckelkorn et al. | |
| 2005/0210876 A1 | 9/2005 | Karni et al. | |
| 2005/0229924 A1 | 10/2005 | Luconi et al. | |
| 2005/0241311 A1 * | 11/2005 | Pronske et al. | 60/645 |
| 2005/0279095 A1 | 12/2005 | Goldman | |
| 2005/0279953 A1 | 12/2005 | Gerst | |
| 2006/0107664 A1 | 5/2006 | Hudson et al. | |
| 2006/0144393 A1 | 7/2006 | Le Lievre | |
| 2006/0150967 A1 | 7/2006 | Hoelle et al. | |
| 2006/0157050 A1 | 7/2006 | Le Lievre | |
| 2006/0174866 A1 | 8/2006 | Zhang | |
| 2006/0181765 A1 | 8/2006 | Jorgensen et al. | |
| 2006/0225729 A1 | 10/2006 | Litwin | |
| 2006/0260314 A1 | 11/2006 | Kincaid et al. | |
| 2006/0266039 A1 | 11/2006 | Skowronski et al. | |
| 2007/0012041 A1 | 1/2007 | Goldman | |
| 2007/0035864 A1 | 2/2007 | Vasylyev et al. | |
| 2007/0084208 A1 | 4/2007 | Goldman | |
| 2007/0157614 A1 | 7/2007 | Goldman | |
| 2007/0157923 A1 | 7/2007 | Le Lievre | |
| 2007/0186921 A1 * | 8/2007 | Swanepoel | 126/600 |
| 2007/0209365 A1 | 9/2007 | Hamer et al. | |
| 2007/0221208 A1 | 9/2007 | Goldman | |
| 2007/0227573 A1 | 10/2007 | Hunter et al. | |
| 2008/0000231 A1 | 1/2008 | Litwin et al. | |
| 2008/0011290 A1 | 1/2008 | Goldman et al. | |
| 2008/0029150 A1 | 2/2008 | Quero et al. | |
| 2008/0034757 A1 | 2/2008 | Skowronski et al. | |
| 2008/0038144 A1 | 2/2008 | Maziasz et al. | |
| 2008/0060636 A1 | 3/2008 | Tuchelt | |
| 2008/0127647 A1 | 6/2008 | Leitner | |
| 2008/0128017 A1 | 6/2008 | Ford | |
| 2008/0134679 A1 | 6/2008 | Cavanaugh et al. | |
| 2008/0184789 A1 | 8/2008 | Eck et al. | |
| 2008/0256952 A1 | 10/2008 | Litwin et al. | |
| 2008/0271731 A1 | 11/2008 | Winston | |
| 2008/0289793 A1 | 11/2008 | Geiken et al. | |
| 2008/0302314 A1 | 12/2008 | Gonzalez et al. | |
| 2009/0032095 A1 | 2/2009 | Schultz et al. | |
| 2009/0056699 A1 | 3/2009 | Mills et al. | |
| 2009/0056701 A1 | 3/2009 | Mills et al. | |
| 2009/0056703 A1 | 3/2009 | Mills et al. | |
| 2009/0084374 A1 | 4/2009 | Mills et al. | |
| 2009/0084760 A1 | 4/2009 | Mayer et al. | |
| 2009/0090109 A1 | 4/2009 | Mills et al. | |
| 2009/0101138 A1 | 4/2009 | Eck et al. | |
| 2009/0107487 A1 | 4/2009 | Gee et al. | |
| 2009/0107488 A1 | 4/2009 | Gee et al. | |
| 2009/0107489 A1 | 4/2009 | Gee et al. | |
| 2009/0126364 A1 | 5/2009 | Mills et al. | |
| 2009/0139515 A1 | 6/2009 | Gee et al. | |
| 2009/0173337 A1 * | 7/2009 | Tamaura et al. | 126/634 |
| 2009/0199888 A1 | 8/2009 | Kuhn | |
| 2009/0208761 A1 | 8/2009 | Silmy et al. | |
| 2009/0322089 A1 | 12/2009 | Mills et al. | |

FOREIGN PATENT DOCUMENTS

| | | |
|---|---|---|
| DE | 28 02 859 A1 | 7/1979 |
| DE | 29 45 908 A1 | 5/1981 |
| DE | 30 03 962 A1 | 8/1981 |
| DE | 94 17 466 U1 | 2/1995 |
| DE | 196 19 021 A1 | 11/1997 |
| DE | 196 51 645 A1 | 6/1998 |
| DE | 197 40 644 A1 | 3/1999 |
| DE | 199 32 646 A1 | 2/2000 |
| DE | 199 32 646 C2 | 2/2000 |
| DE | 198 54 391 A1 | 5/2000 |
| DE | 103 28 321 A1 | 1/2005 |
| DE | 10 2007 052 234 A1 | 4/2009 |
| EP | 0 012 037 A1 | 6/1980 |
| EP | 0 129 821 A2 | 1/1985 |
| EP | 0 129 821 A3 | 1/1985 |
| EP | 0 151 045 A2 | 8/1985 |
| EP | 0 151 045 A3 | 8/1985 |
| EP | 0 526 816 B1 | 2/1993 |
| EP | 0 815 401 B1 | 1/1998 |
| EP | 0 835 849 B1 | 4/1998 |
| EP | 0 856 104 B1 | 8/1998 |
| EP | 0 986 695 B1 | 3/2000 |
| EP | 1 056 978 B1 | 12/2000 |
| EP | 1 164 337 B1 | 12/2001 |
| EP | 2 093 518 A2 | 8/2002 |
| EP | 1 243 872 A2 | 9/2002 |
| EP | 1 243 872 A3 | 9/2002 |
| EP | 1 291 591 A2 | 3/2003 |
| EP | 1 291 591 A3 | 3/2003 |
| EP | 1 519 108 A1 | 3/2005 |
| EP | 1 537 921 A1 | 6/2005 |
| EP | 1 537 921 B1 | 6/2005 |
| EP | 1 598 608 A2 | 11/2005 |
| EP | 1 610 073 A2 | 12/2005 |
| EP | 1 746 363 A2 | 1/2007 |
| EP | 1 754 942 A1 | 2/2007 |
| EP | 1 764 565 B1 | 3/2007 |
| EP | 1 795 829 A2 | 6/2007 |
| EP | 1 801 517 A1 | 6/2007 |
| EP | 1 873 397 A2 | 1/2008 |
| EP | 1 930 587 A2 | 6/2008 |
| EP | 2 000 669 A2 | 12/2008 |
| EP | 2 093 520 A2 | 8/2009 |
| FR | 1520370 A2 | 4/1968 |
| FR | 2 391 420 A1 | 12/1978 |
| FR | 2529960 A1 | 1/1984 |
| FR | 2 529 960 A1 | 1/1985 |
| GB | 2 037 977 A | 7/1980 |
| JP | 56002441 A | 1/1981 |
| JP | 58-062460 A | 4/1983 |
| JP | 63-183346 A | 7/1988 |
| JP | 05-0971791 A | 4/1993 |
| JP | 08-184063 A | 7/1996 |
| JP | 8-260912 A | 10/1996 |
| JP | 2000-97498 A | 4/2000 |
| JP | 2004-069197 A | 3/2004 |
| WO | WO-90/10182 A1 | 9/1990 |
| WO | WO-95/21358 A1 | 8/1995 |
| WO | WO-95/25416 A1 | 9/1995 |
| WO | WO-96/29745 A1 | 9/1996 |
| WO | WO-96/30705 A1 | 10/1996 |
| WO | WO-97/01030 A2 | 1/1997 |
| WO | WO-97/01030 A3 | 1/1997 |
| WO | WO-97/14887 A1 | 4/1997 |
| WO | WO-98/55740 A1 | 12/1998 |

(56) References Cited

FOREIGN PATENT DOCUMENTS

| | | |
|---|---|---|
| WO | WO-99/42765 A1 | 8/1999 |
| WO | WO-99/64795 A2 | 12/1999 |
| WO | WO-99/64795 A3 | 12/1999 |
| WO | WO-00/33001 A1 | 6/2000 |
| WO | WO-01/61254 A1 | 8/2001 |
| WO | WO-01/72508 A1 | 10/2001 |
| WO | WO-02/02995 A2 | 1/2002 |
| WO | WO-02/02995 A3 | 1/2002 |
| WO | WO-02/12799 A2 | 2/2002 |
| WO | WO-02/12799 A3 | 2/2002 |
| WO | WO-02/25184 A1 | 3/2002 |
| WO | WO-02/075225 A2 | 9/2002 |
| WO | WO-02/075225 A3 | 9/2002 |
| WO | WO-02/098553 A1 | 12/2002 |
| WO | WO-2004/066401 A2 | 8/2004 |
| WO | WO-2004/066401 A3 | 8/2004 |
| WO | WO-2004/094924 A2 | 11/2004 |
| WO | WO-2004/094924 A3 | 11/2004 |
| WO | WO-2005/003646 A1 | 1/2005 |
| WO | WO-2005/003647 A1 | 1/2005 |
| WO | WO-2005/010225 A1 | 2/2005 |
| WO | WO-2005/071325 A1 | 8/2005 |
| WO | WO-2005/078360 A1 | 8/2005 |
| WO | WO-2005/088218 A1 | 9/2005 |
| WO | WO-2005/088218 C1 | 9/2005 |
| WO | WO-2005/088218 C2 | 9/2005 |
| WO | WO-2005/119136 A1 | 12/2005 |
| WO | WO-2006/000834 A1 | 1/2006 |
| WO | WO-2006/005303 A1 | 1/2006 |
| WO | WO-2006/008433 A1 | 1/2006 |
| WO | WO-2006/073357 A1 | 7/2006 |
| WO | 2007/024569 A2 | 3/2007 |
| WO | WO-2007/022756 A2 | 3/2007 |
| WO | WO-2007/022756 A3 | 3/2007 |
| WO | WO-2007/031062 A1 | 3/2007 |
| WO | WO-2007/076282 A2 | 7/2007 |
| WO | WO-2007/076282 A3 | 7/2007 |
| WO | WO-2007/087680 A1 | 8/2007 |
| WO | WO-2007/104080 A1 | 9/2007 |
| WO | WO-2007/108976 A2 | 9/2007 |
| WO | WO-2007/108976 A3 | 9/2007 |
| WO | WO-2007/108976 A4 | 9/2007 |
| WO | WO-2007/118223 A2 | 10/2007 |
| WO | WO-2007/118223 A3 | 10/2007 |
| WO | WO-2007/118223 A8 | 10/2007 |
| WO | WO-2007/147399 A2 | 12/2007 |
| WO | WO-2007/147399 A3 | 12/2007 |
| WO | WO-2008/006174 A1 | 1/2008 |
| WO | WO-2008/022409 A1 | 2/2008 |
| WO | WO-2008/027041 A1 | 3/2008 |
| WO | WO-2008/058528 A1 | 3/2008 |
| WO | WO-2008/058866 A1 | 3/2008 |
| WO | WO-2008/092194 A1 | 8/2008 |
| WO | WO-2008/092195 A1 | 8/2008 |
| WO | WO-2008/115305 A2 | 9/2008 |
| WO | WO-2008/115305 A3 | 9/2008 |
| WO | WO-2008/118980 A1 | 10/2008 |
| WO | WO-2008/121335 A1 | 10/2008 |
| WO | WO-2008/121335 C1 | 10/2008 |
| WO | WO-2008/121672-1 | 10/2008 |
| WO | WO-2008/128237 A1 | 10/2008 |
| WO | WO-2008/128746 A2 | 10/2008 |
| WO | WO-2008/128746 A3 | 10/2008 |
| WO | WO-2008/153946 A2 | 12/2008 |
| WO | WO-2008/154521 A1 | 12/2008 |
| WO | WO-2008/154599 A1 | 12/2008 |
| WO | WO-2009/015388 A2 | 1/2009 |
| WO | WO-2009/015388 A3 | 1/2009 |
| WO | WO-2009/029275 A2 | 3/2009 |
| WO | WO-2009/029275 A3 | 3/2009 |
| WO | WO-2009/029277 A2 | 3/2009 |
| WO | WO-2009/029277 A3 | 3/2009 |
| WO | WO-2009/051595 A1 | 4/2009 |
| WO | WO-2009/106103 A1 | 9/2009 |
| WO | WO-2009/106103 A8 | 9/2009 |
| WO | WO-2009/106104 A1 | 9/2009 |
| WO | WO-2009/106104 A8 | 9/2009 |

OTHER PUBLICATIONS

The Aerospace Corporation. (Apr. 1977). "Evaluation of the FMC Line Cavity Central Receiver Concept," *NTIS*, pp. 1-26, table of contents, iii-iv.

Allani, Y. et al. (1997). "$CO_2$ Mitigation Through the Use of Hybrid Solar-combined Cycles," *Proceedings of the Third International Conference on Carbon Dioxide Removal*, Cambridge, MA, Sep. 9-11, 1996, *Energy Covers. Mgt.* 38(Suppl.):S661-S667.

Allani, Y. (1995). "Etude d' une novella centrale Electro-Thermo-solaire a cycle combine bi-combustible," *Journees Internationales de Thermique* (J1TH 95), vol. 2, 1 page. (English Machine Translation).

Allani, Y. (1992). "A Global Concept of a New Type of Solar Combined Cycle Duel Fuel Plant," *presented at 6th International Symposium on Solar Thermal Concentrating Technologies*, Plataforma Solar de Almeria, Spain, Sep. 28-Oct. 2, 1992, pp. 939-943.

Allani, Y. et al. (1991). "Concept Global D'Une Nouvelle Centrale Solaire A Cycle of Combine and Dual Fuel," *Entropie* 164/165:121-122. (French Only)(English Machine Translation).

American Society for Testing Materials International. (Date Unknown, cached version Mar. 19, 2008). "Meta-quartzite From the Rainbow Quarries," Screen shot, two pages.

Anonoymous. (Date Unknown, Web Archive Date Jul. 19, 2008). "Lake Cargelligo Solar Thermal Storage Project," <http://web.archive.org/web/20080719081410/http:/www.lloydenergy.com/prsentations.php>, last visited on Aug. 4, 2010, fifteen pages.

Anonoymous. (Date Unknown, Web Archive Date Jul. 19, 2008). "Cloncurry Solar Thermal Storage Project," <http://web.archive.org/web/20080719080141/http:/www.lloydenergy.com/presentations.php>, last visited on Aug. 4, 2010, fifteen pages.

Anonoymous. (Feb. 12, 2008). "Storing Energy Using Graphite," The Oil Drum: Australia and New Zealand, located at <http://anz.theoildrum.com/node/3608>, last visited on Sep. 1, 2009, seven pages.

Anonoymous. (Feb. 2008). "Electrical News, Quarterly Supplement for Electrical Engineers," *Electrical News* 15:1-12.

Anonoymous. (Date Unknown, Web Archive Date Jul. 19, 2008). "Frequently Asked Questions—Cloncurry Solar Power Pilot Project," located at <http://web.archive.org/web/20080719211253/www.lloydenergy.com/presentations/cloncurry+Solar+Thermal+Storage+Project+FAQ.pdf>, last visited Mar. 2, 2010, three pages.

Anonoymous. (Aug. 9, 2007). "Official Committee Hansard House of Representatives," located at <http://www.ah.gov.au/hansard/reps/committee/r10386.htm>, last visited on Mar. 2, 2010, eighteen pages.

Anonoymous. (May 9, 2007). "Cooma Company's $5 Million Grant," *Monaro Post*, one page.

Anonoymous. (May 8, 2007). "Cooma Project Receives $5 Million in Funding," Bombala Times located at <http://www.bombalatimes.com.au/news/local/news/General/Cooma-project-recieves-5_million-in-funding/267734.aspx>, last visited on Mar. 2, 2010, three pages.

Anonoymous. (May 7, 2007). "Lake Cargelligo Chosen as Solar Energy Project Trial Site," located at <http://www.abc.net.au/news/newsitems/200705/s1916027.htm>, last visited on Feb. 26, 2010, one page.

Anonoymous. (Jun. 1978). "Application of Solar Technology to Today's Energy Needs," Chapter VIII, Office of Technology Assessment, located at <http://www.princeton.edu/~ota/disk3/1978/7802_n.html>, last visited on Mar. 3, 2010, pp. 245-326.

Anonoymous. (Jun. 1978). "Application of Solar Technology to Today's Energy Needs," Chapter IX, Office of Technology Assessment, located at <http://www.princeton.edu/~ota/disk3/1978/7802_n.html>, last visited on Mar. 3, 2010, pp. 329-389.

Anonoymous. (Jun. 1978). "Application of Solar Technology to Today's Energy Needs," Chapter XI, Office of Technology Assessment, located at <http://www.princeton.edu/~ota/disk3/1978/7802_n.html>, last visited on Mar. 3, 2010, pp. 429-483.

(56) References Cited

OTHER PUBLICATIONS

Anonoymous. (1971). "Effect of High Temperature on Hardened Concrete," pp. 1-3.
ASTM International. (2008). "Standard Specification for Electroplated Engineering Nickel Coatings," ASTM International, pp. 1-7.
Bennett, J.E. et al. (Jul. 1976). "Investigations of an Electrodeposited Tin-Nickel Alloy," *J. Eleectrchem. S.* 123(7):999-1003.
Bernhard, R. et al. (Mar. 2008). "Linear Fresnel Collector Demonstration on the PSA. Part I—Design; Construction and Quality Control," presented at the *Proceedings of the 14th SolarPACES International Symposium*, Las Vegas, Nevada, Mar. 4-7, 2008, ten pages.
Birnbaum, J. et al. (Sep. 2008). "A Concept for Future Parabolic Trough Based Solar Thermal Power Plants," *ICPWS XV*, Berlin, Germany, Sep. 8-11, 2008, ten pages.
Bopp, P. et al. (Jun. 1996). "Solare Vorwärmung zur Brennstoffeinsparung in Fossil Befeuerten Kraftwerken," *Solarenergie* 48(6):26-32. (Machine Translation).
Brosseau, D.A. et al. (Jul. 2004). "Testing Thermocline Filler Materials and Molten-Salt Heat Transfer Fluids for Thermal Energy Storage Systems Used in Parabolic Trough Solar Power Plants," SAND2004-3207, pp. 1-95.
Bruhn, M. et al. (1996). "Criteria for the Assessment of Concepts for the Use of Solar Energy in Combine Heat and Power," presented at *Proceedings of EuroSun '96*, pp. 1695-1700.
Bruhn, M. (1994). Einsatz von Solarenergie in der zentralen Wärme-Kraft-Kopping, *HLH Bd.* 45(11):573-576. (Machine Translation).
Buie, D. et al. (Sep. 2002). "Optical Considerations in line Focus Fresnel Concentrators," presented at *11th Proceedings of the 11th Solar PACES International Symposium on Solar Thermal Concentrating Technologies*, Sep. 3-6, 2002, Zurich, Switzerland, located at <http://www.physics.usyd.edu.au/app/solar/publications/index.html>, last visited Aug. 27, 2010, pp. 1-6.
Burbidge, D. et al. (2000). "Stanwell Solar Thermal Power Project," presented at *10th Symposium on Solar Thermal Concentrating Technologies*, Sydney, Australia, six pages.
Burley, S.M. et al. eds. (1994). Proceedings of Solar '94, the 1994 American Solar Energy Society Annual Conference, San Jose, CA, Jun. 25-30, 1994, pp. vi-ix.
Buschle, J. et al. (2006). "Latent Heat Storage for Process Heat Applications," located at <http://de.scientificcommons.org/37481048>, last visited Aug. 27, 2010 pp. 1-8.
Carden, P.O. (1977). "Energy Corrandiation Using the Reversible Ammonia Reaction," *Solar Energy* 19(4):365-378.
Carvalho, P.A. et al. (2000). "High-Resolution Transmission Electron Microscopy Study of Discontinuously Precipitated $Ni_3Sn$," *ACTA Matr.* 48:4203-4215.
Copeland, R.J. et al. (Nov. 1983). "For Water/Steam, Organic Fluid, and Air/Brayton Solar Thermal Collector Receivers," in *Comparative Ranking of Thermal Storage Systems, vol. 1*, Solar Energy Research Institute, Golden, Colorado, 116 pages.
Darnell, J.R. et al. (1980). "A Solar-Fossil Combined Cycle Power Plant," AS/ISES 1980 Proceedings of the 1980 Annual Meeting American Section of the International Solar Energy Society, Inc., Jun. 2-6, 1980, Phoenix, Arizona, pp. 563-567.
Deleon, P. et al. (Dec. 1979). "Solar Technology Application to Enhanced Oil Recovery," Solar Energy Research Institute, U.S. Department of Energy Contact No. EG 77 C 01 4042, pp. 1-110.
Dey, C.J. (2004). "Heat Transfer Aspects of an Elevated Linear Absorber," *Solar Energy* 76:243-249.
Dey, C.J. et al. (2000). "Operation of a CLFR Research Apparatus," *Proceedings of the 38th Annual Conference of the Australian and New Zealand Energy Society, Solar 2000—From Fossils to Photons*, Brisbane, Australia, Nov. 28, 2000 through Dec. 1, 2000, pp. 516-527.
Di Canio, D.G. et al., (Apr. 1979). "Line Focus Solar Thermal Central Receiver Research Study: Final Report for Period Apr. 30, 1977-Mar. 31, 1979," FMC Corporation: Santa Clara, CA, U.S. Department of Energy Solar Energy Under Contract E4-76-C-03-1246, DOE/ET 20426-1, 316 pages.
Dubberly, L.J. et al. (Nov. 1983). "Comparative Ranking of Thermal Storage Systems," in *Comparative Ranking of Thermal Storage Systems, vol. 11*, Solar Energy Research Institute, Golden, Colorado, 294 pages.
Eck, M. et al. (2007). "Direct Solar Steam in Parabolic Troughs—Simulation of Dynamic Behavior," presented at the 2007 Parabolic Trough Technology Workshop, Golden, Colorado, Mar. 8-9, 2007, twenty-five pages, located at <http://www.nrel.gov/csp/troughnet/wkshp_2007.html>, last visited on Aug. 27, 2010.
Eckstock. (2006). "Session Descriptions," *Proceedings of ECKSTOCK, The Richard Stockton College New Jersey*, Pomona, New Jersey, May 31-Jun. 2, 2006, Pomona, New Jersey, fifty-five pages.
Electric Power Research Institute. (Oct. 2008). "Solar Augmented Steam Cycles for Coal Plants," *Electric Power Research Institute*, two pages.
Elsaket, G. (Sep. 2007). "Simulating the Integrated Solar Combined Cycle for Power Plants Application in Libya," Thesis for G. Elsaket for Cranfield University, 116 pages.
FMC Corporation. (Feb. 1977). "Solar Thermal Central-Receiver Research Study," DOE/ET/20426-T6, pp. 1-109, Appendix A,B,C,D, 160 pages.
Francia, G. (1968). "Pilot Plants of Solar Steam Generating Stations," *Solar Energy* 12:51-64.
Goebel, O. et al. (2002). "Parabolic Trough Collector with Foldable Reflector FC1: Design, Test Programme and Experiences" *Proceedings of the 11the SolarPACEs International Symposium on Concentrated Solar Power and Chemical Technologies*, Zurich, Switzerland, Sep. 4-6, 2002, five pages.
Gorman, D.N. (Jul. 1987). "Assessment of Central Receiver Solar Thermal Enhanced Oil Recovery Systems," Thermal Power Systems, Contactor Report DR 0302-6, pp. 119 pages.
Häberle, A. et al. (Sep. 2002). "The Solarmundo Line Focussing Fresnel Collector. Optical and Thermal Performance and Cost Calculations," located at: <http://www.ise.fraunhofer.de/veroeffentlichuncien/nach-jahrgaengen/2002/the-solarmundo-line-focussing-fresnel-collector-optical-and-thermal-performance-and-cost-calculations>, last visited Jul. 27, 2009, eleven pages.
Hassoun, J. et al. (2006, e-pub. Apr. 17, 2006). "Electrodeposited Ni-Sn Intermetallic Electrodes for Advanced Lithium Ion Batteries," *Journal of Power Sources* 160:1336-1341.
Hollis, S. (Aug. 2006). "A New Thermal Energy Storage System," presented at the $82^{nd}$ Annual EESA Conference Trade Exhibition—Electricity 2006, At the Flick of a Switch, Aug. 2006, Melbourne, Australia, twenty pages.
Hu, E.J. et al. (Jun. 2003). "Solar Power Boosting of Fossil Fuelled Power Plants," *Proceedings ISES Solar World Congress*, Goteborg. Sweden, Jun. 14-19, 2003, seven pages.
International Search Report mailed on Jun. 25, 2009, for PCT Application No. PCT/US2008/010230, filed on Aug. 27, 2008, five pages.
International Search Report mailed on May 6, 2009, for PCT Application No. PCT/US2008/007419, filed on Jun. 13, 2008, three pages.
International Search Report mailed on Apr. 8, 2009, for PCT Application No. PCT/US2008/066185, filed on Jun. 6, 2008, three pages.
International Search Report mailed on Sep. 26, 2008, for PCT Application No. PCT/US2008/007098, filed on Jun. 6, 2008, three pages.
International Search Report mailed on Oct. 15, 2007, for PCT Application No. PCT/AU2007/001232, filed on Aug. 27, 2007, three pages.
International Search Report mailed on May 3, 2007, for PCT Application No. PCT/AU2007/000268, filed on Mar. 2, 2007, two pages.
International Search Report mailed on May 24, 2005, for PCT Application No. PCT/AU2005/000208, filed on Feb. 17, 2005, two pages.
International Search Report mailed on Aug. 31, 2004, for PCT Application No. PCT/AU2004/000884, filed on Jul. 1, 2004, two pages.
Jance, M.J. (Jun. 2003). "Experimental and Numerical Analysis of Combined Convection and Radiation Heat Transfer Within a Stratified Trapezoidal Cavity," Thesis Project Report, University of New South Wales, 219 pages.
Jance, M.J. et al. (2000). "Natural Convection and Radiation within an Enclosed Inverted Absorber Cavity: Preliminary Experimental Results," *ANZSES Annual Conference—From Fossils to Photons*, Brisbane, Australia, 2000, seven pages.

(56) References Cited

OTHER PUBLICATIONS

Katumba, G. et al. (2008, e-pub. Dec. 10, 2007). "Solar Selective Absorber Functionality of Carbon Nanoparticles Embedded in SiO2, ZnO and NiO Matrices," Phys. Stat. Sol. 5(2):549-551.

Katumba, G. et al. (Jul. 2006). "Selective Solar Absorbers: A Cost Effective Solution for Access to Clean Energy in Rural Africa," *SAIP 2006*, Jul. 5, 2006, Capetown, South Africa, pp. 1-9.

Katumba, G. et al. (2006). "Solar Selective Absorber Functionality of Carbon Nanoparticles Embedded in $Si_2$, ZnO and NiO Matrices," *SAIP 2006*, University of Zimbabwe, Harare, Zimbabwe, twenty-nine pages.

Kennedy, C. (Apr. 2008). "Session:CSP Advanced Systems: Optical Materials Organization: National Renewable Energy Laboratory," Solar Energy Technologies Program, Apr. 22-24, 2008, Austin, Texas, pp. 1-30.

Kennedy, C. et al. (Mar. 2007). "Progress Toward Developing a Durable High-Temperature Solar Selective Coating," *2007 Parabolic Trough Technologies Workshop*, Mar. 8-9, 2007, Golden, Colorado, one page.

Kennedy, C. et al. (Jan. 2005). "Development and Testing of High-Temperature Solar Selective Coatings," presented at the 2004 DOE Solar Energy Technologies, Oct. 25-28, 2004, Denver, Colorado, 5 pages.

Kennedy, C.E. et al. (Mar. 2008). "Progress to Develop an Advanced Solar-Selective Coating," *$14^{th}$ Biennial CSP Solar PACES Symposium*, Mar. 4-7, 2008, Las Vegas, Nevada, pp. 1-9.

Kennedy, C.E. (Oct. 10, 2007). "Advances in Concentrating Solar Power Collectors: Mirrors and Solar Selective Coating," *presented at AIMCAL*, Scottsdale, Arizona, Oct. 10, 2007, pp. 1-69.

Kennedy, C.E. (Jul. 2002). "Review of Mid-to High-Temperature Solar Selective Absorber Materials," Technical Report—NREL, 58 pages.

Künstle, K. et al. (May 1994). "Solar Powered Combined Cycle Plant," *Power-Gen Europe '94*, May 17-19, 1994, Cologne, Germany, 6/7:134-151.

Laing, D. (Mar. 9, 2007). "Storage Development for Direct Stream Generation Power Plants," presented at Parabolic Trough Technology Workshop, Golden, CO, Mar. 9, 2007, pp. 1-21.

Laing, D. (Mar. 8, 2007). "Concrete Storage Development for Parabolic Trough Power Plants," presented at Parabolic Trough Technology Workshop, Golden, CO, Mar. 8, 2007, pp. 1-17.

Lefrois, R.T. (Date Unknown). "Active Heat Exchange System Development for Latent Heat Thermal Energy Storage," Honeywell, Inc., pp. 338-353.

Le Lièvre, P. et al. (Sep. 2006). "Design of 6.5 MW Solar Thermal Electricity Plant with Zero Fossil Fuel Backup," presented at *ANZSES Annual Conference—Clean Energy?—Can Do!*, Canberra, Australia, Sep. 13-15, 2006, seven pages.

Lippke, F. (1994). "Numerische Simulation der Absorberdynamkik von Parabolrinnen-Solar-kraftwerken mit direkter Dampferzeugung," *VDI* 6(307):1-115. (Machine Translation).

Lovegrove, K. et al. (2004). "Developing Ammonia Based Thermochemical Energy Storage for Dish Power Plants," *Solar Energy* 76:331-337.

Lovegrove, K. et al. (1996). "Endothermic Reactors for an Ammonia Based Thermo-chemical Solar Energy Storage and Transport System," *Solar Energy* 56(4):361-371.

Marko, A. (Jul./Aug. 1995). "Verbesserung fossilgefeuerter Dampfkraftwerke durch solare Wämezufuhr," *BWK* 47(7/8):303-308. (Machine Translation).

Marko, A. et al. (Mar. 1994). "Solar Ybteerstützte Konventionellle Kraftwerke für Mittel-und Südeuropa," *BWK Bd.* 46(5):247-253. (Machine Translation).

Mertins, M. et al. (Jan. 1, 2004). "Geometry Optimization of Fresnel-Collectors with Economic Assessment," pp. 1-8.

Mills, D. et al. (Aug. 2005). "Cheaper Than Coal?" *International Solar Energy Society Solar World Congress*, Orlando, Florida, Aug. 6-12, 2005, eight pages.

Mills, D. (2004, e-published Apr. 24, 2003). "Advances in Solar Thermal Electricity Technology," *Solar Energy* 76:19-31.

Mills, D. et al. (2004). "Design of a 240 $MW_e$ Solar Thermal Power Plant," presented at *Eurosun 2004 Conference*, located at <http://www.ausra.com/pdfs/Design240MWsolarthermalpowerplant_Mills_2004>, last visited on Jul. 20, 2009, eight pages.

Mills, D. et al. (Aug. 2002). "The Future for Solar Thermal," *Proceedings of the $8^{th}$ Renewable & Sustainable Power Conference*, Alice Springs, Australia, Aug. 12-13, 2002, twenty pages.

Mills, D. et al. (Sep. 2002). "Lower Temperature Approach for Very Large Solar Powerplants," presented at *$11^{th}$ SolarPaces*, Sep. 4-6, 2002, Zurich, Switzerland, six pages.

Mills, D.R. et al. (2006). "Compact Linear Fresnel Reflector Progress," *Solar PACES 2006*, pp. 1-7.

Mills, D.R. et al. (Feb. 2006). "Multi-tower Line Focus Fresnel Array Project," *Journal of Solar Energy Engineering* 128(1):118-120.

Mills, D.R. et al. (Dec. 2004). "First Results from Compact Linear Fresnel Reflector Installation," *Proceedings Solar 2004, Australian and New Zealand Energy Society*, Murdoch Dec. 2004, seven pages.

Mills, D.R. et al. (Mar. 2004). "Case Study: Low Cost Solar Thermal Power Development in NSW," *Proceedings at Enviro 2004*, Mar. 28, 2004, seven pages.

Mills, D.R. et al. (Mar. 2003). "Multi-Tower Line Focus Fresnel Arrays," *Proceedings of ISEC 2003: International Solar Energy Conference*, Manua Kea Resort, Hawaii Island, Hawaii, USA, Mar. 16-18, 2003, six pages.

Mills, D.R. et al. (Nov. 2003). "Solar Preheating of the Liddell Coal-fired Powerplant," *ANZSES Annual Conference 2003*, Nov. 26-29, 2003, pp. 600-604.

Mills, D.R. et al. (2002). "Project Proposal for a Compact Linear Fresnel Reflector Solar Thermal Plant in the Hunter Valley," located at <http://solar1.mech.unsw.edu.au/glm/papers/Mills_projectproposal_newcastle.pdf>, last visited on Jul. 20, 2009, six pages.

Mills, D.R. et al. (Mar. 2000). "Compact Linear Fresnel Reflector Solar Thermal Powerplants," *Solar Energy* 68(3):263-283.

Mills, D.R. et al. (1997). "Advanced Fresnel Reflector Powerplants—Performance and Generating Costs," *Proceedings of Solar 97—Australia and New Zealand Solar Energy Society*, paper 84, pp. 1-9.

Morrison, G.L. (Nov. 2006). "Large Scale Solar Thermal Electricity," Australia-China Energy Symposium, Sydney, Australia, Nov. 2006, twenty-five pages.

Morrison, G.L. et al. (2001). "Water-in-Glass Evacuated Tube Solar Water Heaters," *Proceedings of ISES 2001 Solar World Congress*, Adelaide, Australia, Nov. 25-30, 2001, pp. 545-550.

Morrison, G.L. et al. (1999). "Solar Thermal Power Systems—Stanwell Power Station Project," *ANZSES Annual Conference*, Geelong, Australia, 1999, ten pages.

National Renewable Energy Laboratory. (Sep. 2000). "Survey of Thermal Storage for Parabolic Trough Power Plants," Period of Performance: Sep. 13, 1999-Jun. 12, 2000, Pikington Solar International GmbH, Cologne, Germany, 61 pages.

Nava, P. et al. (Mar. 2007). "Trough Thermal Storage—Status Spring 2007," NREL/DLR Trough Workshop, Denver, CO, pp. 1-19.

NIR News. (Oct./Nov. 2005). "A Celebration of Near Infrared Spectroscopy," *NIR News* 16(7):32 pages.

Nitarski, M.J. et al. (Jul. 2000). "Combined Radiation and Natural Convection in a Trapezoidal Cavity Absorber: An Experimental Study," Proceedings of the Seventh Australasian Heat and Mass Transfer Conference, James Cook University, Townsville, Jul. 2000, pp. 251-256.

Odeh, S. et al. (Dec. 1998). "Hydrodynamic Model for Horizontal and Inclined Solar Absorber Tubes for Direct Steam Generation Collectors," presented at *$13^{th}$ Australasian Fluid Mechanics Conference*, Dec. 13-18, 1998, Monash University, Melbourne, Australia, four pages.

Odeh, S. et al. (Oct. 1998). "Performance of Horizontal and Inclined Direct Steam Generation Trough Solar Collectors," presented at *ANZSES 1998*, Oct. 1998, Perth, Australia, eight pages.

Pacheco, J.E. et al. (May 2002). "Development of Molten-Salt Thermocline Thermal Storage System for Parabolic Trough Plants," *Journal of Solar Energy Engineering* 124:153-159.

Pacheco, J.E. et al. (Apr. 2001). "Development of a Molten-Salt Thermocline Thermal Storage System for Parabolic Tough Plants,"

(56) References Cited

OTHER PUBLICATIONS

Proceedings of Solar Forum 2001, Solar Energy: The Power to Chose, Apr. 21-25, 2001, Washington, D.C., pp. 1-9.
Paasso, J. (Nov. 2007). "Moisture Depth Profiling in Paper Using Near-Infrared Spectroscopy," VIT Technical Research Centre Finland, 204 pages.
Peterson, J. (Dec. 2008). "Super-Concrete to Store Solar Power Works," TreeHugger, located at <http://www.treehugger.com/files/2008/12/thermal-storage-concrete.php>, last visited on Jul. 15, 2000, pp. 1-5.
Pye, J. (Date Unknown). "Compact Linear Fresnel Reflector," 7 pages.
Pye, J. et al. (Jul. 2003). "Convection Inside the Cavity Receiver of the CLFR Concentrating Solar Power System," $7^{th}$ Natural Convection Workshop, Sydney, Australia, 2003, two pages.
Pye, J.D. et al. (2004). "Steam-circuit Model for the Compact Linear Fresnel Reflector Prototype," ANZSES Solar 2004: Life, the Universe and Renewables, Nov. 30 through Dec. 3, 2004, Perth, Western Australia, pp. ten pages.
Pye, J.D. et al. (Nov. 2003). "Transient Modelling of Cavity Receiver Heat Transfer for the Compact Linear Fresnel Reflector," ANZSES Solar 2003, Melbourne, Australia, Nov. 23-29, 2003, nine pages.
Pye, J.D. et al. (Jun. 2003). "Modelling of Cavity Receiver Heat Transfer for the Compact Linear Fresnel Reflector," ISES World Congress, Jun. 14-19, 2003. eight pages.
Reynolds, D.J. (2005). "A Thermal and Hydrodynamic Model for a Compact Linear Fresnel Reflector-Type Solar Thermal Collector," University of New South Wales, 291 pages.
Reynolds, D.J. et al. (2004). "An Experimental and Computational Study of the Heat Loss Characteristics of a Trapezoidal Cavity Absorber," Solar Energy 76:229-234.
Reynolds, D.J. (2002). "A Hydrodynamic Model for a Line-Focus Direct Steam Generation Solar Collector," Proceedings of Solar 2002—Australia and New Zealand Solar Energy Society—Solar Harvest, Newcastle, Australia, 2002, six pages.
Reynolds, D.J. et al. (Nov. 2001). "An Experimental and Computational Study of the Heat Loss Characteristics of a Trapezoidal Cavity Absorber," Proceedings of ISES 2001 Solar World Congress, Adelaide, Australia, Nov. 25-30, 2001, pp. 919-924.
Reynolds, D.J. (2000). "Heat Transfer in a Trapezoidal Cavity Absorber for a Solar Thermal Collector," ANZSES Annual Conference—Renewable Energy Transforming Business, Brisbane, Australia, 2000, pp. 547-555.
Reynolds, D.J. et al. (Jun. 2000). "Combined Radiation and Natural Convection in a Trapezoidal Cavity Absorber," Proceedings $7^{th}$ Australasian Heat Transfer and Mass Transfer Conference, Townsville, Australia, Jun. 2000, as posted on <http://solar1.mech.unsw.edu.au/glm/galm-papers/7AHMTC_reynolds.pdf>, last visited on Aug. 7, 2009, six pages.
Risenenkampf, W. et al. (2001). "New High-Tin Phase Found in Electrolytic Sn-Ni Deposits," Journal of Materials Science 36:4633-4636, Abstract Only.
Schramek, P. et al. (2004). "Heliostats for Maximum Ground Coverage," Energy 29:701-713.
Solar Energy Research Institute. (Nov. 1989). "Phase-Change Thermal Energy Storage. Final Subcontract Report On the Symposium Held Oct. 19-20, 1988, Helendale, California," U.S. Department of Energy Contract No. DE-AC0283CH10093, 151 pages.
SolarPACES. (Sep. 2009). "SolarPACES 2009 Program" SolarPACES 2009, Sep. 15-18, 2009, Berlin Germany, nineteen pages.
Solar Progress (Oct. 2004). "Solar Progress Renewable Energy for Australasia," Solar Progress 25(3):1-35.
Stanley, N.E. (Apr. 1982). "An Overview of Engineering and Agricultural Design Considerations of the Raft River Soil-Warming and Heat Dissipation Experiment," EG&G Idaho, Inc., U.S. Department of Energy Idaho Operations Office Under DOE Contact No. DE-AC07-76ID01570, pp. 1-23.
Stine, W.B. et al. (1985). "Power Cycles and Design for Solar Applications," Solar Energy Fundamentals and Design with Computer Applications, John Wiley & Sons, New York, New York, pp. xiii-xiv. (Table of Contents.).
Stine, W.B. et al. (1985). "Power Cycles for Solar Applications," Chapter 12 in Solar Energy Fundamentals and Design with Computer Applications, John Wiley & Sons, New York, New York, pp. 281-334.
Stine, W.B. et al. (1985). "Solar Thermal Projects," Chapter 14 in Solar Energy Fundamentals and Design with Computer Applications, John Wiley & Sons, New York, New York, pp. 364-396.
Stroll, R. (Nov. 1977). "Collectors," Chapter VIII in Solar Technology to Today's Energy Needs, pp. 245-301.
Tamaura et al.. (Jun. 2006). "A Novel Beam Down System for Solar Power Generation with Multi-ring Central Reflectors and Molten Salt Thermal Storage," presented at $13^{th}$ International Symposium on Concentrating Solar Power and Chemical Energy Technologies, Jun. 20-23, 2006, Seville, Spain, located at <http://www.fundacionsener.es/EPORTAL_DOCS/GENERAL/FILE-cw7646d431b8c543d7b45a/ANOVELBEAM-DOWNSYSTEM.pdf>, last visited on Mar. 2, 2010, eight pages.
Tamme, R. (Jun. 2008). "TES for Process Heat and Power Generation," Symposium "Material Development for Thermal Energy Storage," presented at Phase Change Materials and Chemical Reaktions, Jun. 4-6, 2008, Bad Tölz, pp. 1-25.
Tamme, R. (Oct. 2007). "Future Storage System," presented at World Solar Power, Seville, Spain, Oct. 24-26, 2007, pp. 1-22.
Tamme, R. (Jun. 21, 2007). "Storage Technology for Process Heat Applications," Preheat Symposium, Jun. 21, 2007, Freiburg, Germany, pp. 1-24.
Tamme, R. (Feb. 2006). "Thermal Energy Storage: Concrete & Phase Changes TES," presented at 2006 Parabolic Trough Technology Workshop, Feb. 13, 2006, Incline Village, NV, pp. 1-28.
Tanner, A.R. (Nov. 2003). "Application of Underground Thermal Energy Storage for Solar Thermal Power Generation in New South Wales," School of Aerospace, Mechanical and Mechatronic Engineering, The University of Sydney, 124 pages.
Tegehall, P-E. (Mar. 2006). "Review of the Impact of Intermetallic Layers on the Brittleness of Tin-Lead and Lead-Free Solder Joints," IVF Project Report 06/07, pp. 1-63.
Tesfamicharel, T. (2000). "Characterization of Selective Solar Absorbers. Experimental and Theoretical Modeling" ACTA Universitatis Upsaliensis Uppsala pp. 4-79.
Tomlinson, W.J. et al. (1990). "Substrate Roughness Deposit Thickness and the Corrosion of Electroless Nickel Coatings," Journal of Material Science 25:4972-4976.
Turkenburg, W.C. et al. (2000) "Renewable Energy Technologies," Chapter 7 in World Energy Assessment: Energy and the Challenge of Sustainability, Washington, D.C., UNDP, pp. 220-272.
Turner, R.H. (Dec. 15, 1979). "High Temperature Thermal Energy Storage in Steel and Sand," DOE/NASA/0100-79-1, 95 pages.
Turner, R.H. (1978). High Temperature Thermal Energy Storage, Including a Discussion of TES Intergrated Into Power Plants, Part 1 and Part II, 51 pages.
Turner, R.H. et al. (1978). "High Temperature Thermal Energy Storage in Moving Sand," Proceedings of the 13th Intersociety Energy Conversion Engineering Conference, San Diego, CA, Aug. 20-25, 1978, pp. 923-927.
U.S. Appl. No. 61/007,926, filed Aug. 27, 2007, for Mills et al.
U.S. Appl. No. 60/934,549, filed Jun. 13, 2007, for Mills et al.
U.S. Appl. No. 60/933,648, filed Jun. 6, 2007, for Mills et al.
U.S. Appl. No. 60/933,615, filed Jun. 6, 2007, for Mills et al.
U.S. Appl. No. 60/933,620, filed Jun. 6, 2007, for Mills et al.
U.S. Appl. No. 60/933,574, filed Jun. 6, 2007, for Mills et al.
U.S. Appl. No. 60/933,619, filed Jun. 6, 2007, for Mills.
U.S. Appl. No. 60/933,637, filed Jun. 6, 2007, for Mills et al.
U.S. Appl. No. 12/157,064, filed Jun. 6, 2008, for Mills et al.
U.S. Appl. No. 12/135,124, filed Jun. 6, 2008, for Mills et al.
U.S. Appl. No. 12/135,039, filed Jun. 6, 2008, for Mills et al.
U.S. Appl. No. 12/012,920, filed Feb. 5, 2008, for Mills et al.
U.S. Appl. No. 12/012,829, filed Feb. 5, 2008, for Mills et al.
U.S. Appl. No. 12/012,821, filed Feb. 5, 2008, for Mills et al.
U.S. Appl. No. 11/895,869, filed Aug. 27, 2007, for Mills et al.

(56) References Cited

OTHER PUBLICATIONS

Von Tobias Mauelshagen. (Date Unknown). "Technologie der Solar Power am beispieleines 10MWe Fresenelkraftwerkes," Solar Power Group Workshop, Solar Power Group GmbH, Nov. 20, 2008, Berlin, Germany, located at <http://www.mss-csp.info/cms/upload/pdf/Berlin_Nov_2008/7.Solar_Power_Group_-_Prsentation_Mauelshagen_Workshop_Berlin_20112008.pd,> last visited on Aug. 27, 2010. pp. 1-31. (English Translation Included).
Written Opinion mailed on May 6, 2009, for PCT Application No. PCT/US2008/007419, filed on Jun. 13, 2008, six pages.
Written Opinion mailed on Apr. 8, 2009, for PCT Application No. PCT/US2008/066185, filed on Jun. 6, 2008, seven pages.
Written Opinion mailed on Jun. 30, 2008, for PCT Application No. PCT/US2008/010230, filed on Aug. 27, 2008, ten pages.
Written Opinion mailed on Sep. 26, 2008, for PCT Application No. PCT/US2008/007098, seven pages.
Written Opinion mailed on May 24, 2005, for PCT Application No. PCT/AU2005/000208, filed on Feb. 17, 2005, three pages.
Wynne, B.E. et al (Jan. 1972). "The Transformation on Annealing of the Metastable Electrodeposit, $NiSn_x$ to Its Equilibrium Phases," *Metallurgical Transactions* 3:301-305.
Zöllner, V.G. et al. (1989). "Rechnerische Simulation von Heizkraftprozessen als Instrument zur Parametervariation und Optimierung," FWI 18(5):466-471. (Translation of the Abstract Only.).
Zoschak, R.J. et al. (1974). "Studies of the Direct Input of Solar Energy to a Fossil Fueled Central Station Steam Power Plants," *Solar Energy* 17:297-305.
International Search Report mailed on Jun. 27, 2011, for PCT/US2008/007130, filed on Jun. 6, 2008, six pages.
Kribus, A. (2002). "A High-Efficiency Triple Cycle for Solar Power Generation," *Solar Energy* 72(1):1-11.
Non-Final Office Action mailed on Jul. 11, 2011, for U.S. Appl. No. 12/157,064, filed Jun. 6, 2008, 11 pages.
U.S. Appl. No. 12/157,879, filed Jun. 13, 2008, for Mills.
Written Opinion mailed on Jun. 27, 2011, for PCT/US2008/007130, filed on Jun. 6, 2008, eight pages.
Office Action received for Chinese Patent Application No. 200880102142.1, mailed on Mar. 6, 2013, 20 pages (11 Pages of English Translation and 9 pages of Office Action).
Extended European Search Report received for Patent Application No. 12168701.6, mailed on Jul. 4, 2012, 7 pages.
International Preliminary Report on Patentability received for PCT Patent Application No. PCT/US2008/007098, issued on Dec. 7, 2009, 7 pages.
International Preliminary Report on Patentability received for PCT Patent Application No. PCT/US2008/007130, issued on Jul. 5, 2011, 7 pages.
Notice of Allowance received for U.S. Appl. No. 12/157,064, mailed on Oct. 16, 2012, 6 pages.
Office Action received for Chinese Patent Application No. 200880101997.2, mailed on Jan. 7, 2013, 6 pages (3 pages of English Translation and 3 pages of Original Office Action).
Office Action received for European Patent Application No. 08768175.5, mailed on Jan. 19, 2012, 4 pages.
Office Action received for European Patent Application No. 08768175.5, mailed on Mar. 23, 2011, 4 pages.
Office Action received for European Patent Application No. 08768175.5, mailed on May 12, 2010, 5 pages.
Office Action received for European Patent Application No. 08768205.0, mailed on Jul. 25, 2012, 5 pages.
Decision to Grant received for Chinese Patent Application No. 200880101997.2, mailed on Jun. 21, 2013, 4 pages (2 pages of English Translation and 2 pages of Official copy).
Office Action received for European Patent Application No. 08768175.5, mailed on Aug. 5, 2013, 4 pages.
Office Action received for European Patent Application No. 12168701.6, mailed on Nov. 11, 2013, 4 pages.
Office Action received for Australian Patent Application No. 2008262380, issued on Dec. 10, 2013, 3 pages.

\* cited by examiner

COMBINED CYCLE POWER PLANT

CROSS-REFERENCE TO RELATED APPLICATIONS

This application claims benefit of priority from U.S. Provisional Patent Application Ser. No. 60/933,619, entitled "Combined Cycle Power Plant," filed Jun. 6, 2007, which is hereby incorporated by reference herein in its entirety. This application is also related to U.S. patent application Ser. No. 12/157,064 entitled "Integrated Solar Energy Receiver-Storage Unit", which claims benefit of priority from U.S. Provisional Patent Application Ser. No. 60/933,620, entitled "Integrated Solar Energy Receiver-Storage Unit," filed Jun. 6, 2007, each of which is hereby incorporated by reference herein in its entirety.

FIELD

This application relates to a combined cycle power plant that incorporates a thermal energy storage system.

BACKGROUND

Well known are thermal power plants that combine Brayton cycle and Rankine cycle systems and in which heat recovered from exhausted Brayton cycle fluid is employed in a Heat Recovery Steam Generator ("HRSG") to generate or augment the generation of steam for expansion in the Rankine cycle system. These known combined cycle systems combining two thermodynamic cycles in sequence can provide for greater operating efficiency and/or faster start-up than single cycle systems.

SUMMARY

Broadly, methods and combined cycle power plants are disclosed here in which a mediating thermal energy storage unit is used to store waste or residual thermal energy garnered from a portion of the plant which employs a top thermodynamic cycle to generate electricity, so that the stored residual thermal energy may be used as an energy source in a portion of the plant which employs a bottom thermodynamic cycle to generate additional electricity.

Thus, methods are disclosed here that comprise (a) generating electrical energy and residual thermal energy using a first top-cycle heat engine operating with a top thermodynamic cycle, (b) storing at least a portion of the residual thermal energy, and (c) using at least a portion of the stored residual thermal energy to generate additional electrical energy in a first bottom-cycle heat engine operating with a bottom thermodynamic cycle. Some methods may comprise storing all of the recovered residual thermal energy, whereas other methods may comprise storing a portion of the recovered residual thermal energy and diverting a portion of the residual thermal energy for immediate use in generating electricity via the bottom thermodynamic cycle.

The methods may comprise using any suitable fuel or energy source to drive a top cycle heat engine. For example, solar energy may be used, such as solar energy collected from a tower solar array (e.g., a multi-tower solar array), a solar array using parabolic troughs, or a linear Fresnel reflector solar array. Alternatively or in addition, fuels such as fossil fuels and/or biomass-derived fuels may be used to power a top cycle heat engine. In certain cases, a supplemental energy source (e.g., solar energy, fossil fuel, and/or biomass-derived fuel) may be used in addition to the stored thermal energy to drive a bottom cycle heat engine.

The methods may comprise generating electricity using any suitable combination of top and bottom cycle heat engines generating electrical energy. For example, in some variations, the top cycle heat engine may employ a Brayton cycle, and such top cycle heat engines include a heavy duty Brayton cycle turbine that may be powered by natural gas or an aeroderivative Brayton cycle turbine that may be powered by natural gas. Externally heated versions of the Brayton cycle heat engine are possible and, if heat is recuperated between the expansion and compression portions of these heat engines, the externally-heated versions are said to use the Ericsson cycle. Solar heat is one form of external heat that may be applied to a Brayton-cycle or Ericsson-cycle heat engine. A bottom cycle heat engine may employ a Rankine or Kalina cycle where the working fluid undergoes a phase change. Thus, the methods may comprise compressing, heating and expanding a first working fluid through a first turbine to drive a first electrical generator which employs a top thermodynamic cycle, storing residual thermal energy contained in the first working fluid following its expansion, heating a second working fluid with the stored thermal energy, and generating electrical energy with a second electrical generator using the heated second working fluid, e.g., in a Rankine cycle heat engine. Any suitable working fluids may be used in the top and bottom thermodynamic cycles, e.g., the first working fluid may comprise primarily air (e.g., ambient air), and the second working fluid may comprise steam, water, a steam/water mixtures, or a hydrocarbon fluid.

If the plant includes a Rankine cycle heat engine in its bottom thermodynamic cycle to generate electricity, for instance, the methods may comprise heating the second working fluid with the stored thermal energy, and expanding the heated second working fluid through a second turbine coupled to a second electrical generator. In some variations of a Rankine cycle heat engine, the heated compressed second working fluid may be successively expanded through a series of multiple expansion stages, e.g. multiple turbines. In these variations, the methods may comprise reheating the second working fluid between expansion stages, which reheating in some variations may be accomplished using stored thermal energy recovered from the top cycle heat engine.

The methods may comprise storing residual thermal energy recovered from a top cycle heat engine using any suitable mediating thermal energy storage system. For example, thermal energy storage systems utilizing a thermal energy storage medium comprising an aggregate, sand, concrete, a molten salt, or phase change material (e.g. paraffin, fatty acid, or salt hydrate) or a combination thereof may be used.

The methods may comprise storing the residual thermal energy recovered from a top cycle heat engine for any desired length of time. For example, in some cases, the stored thermal energy may be stored on a transient basis, e.g., for a period of about 15 minutes or less. In other cases, the stored thermal energy may be stored for more extended periods, e.g., for a period longer than about 15 minutes, such as a few hours. In some cases, a storage period may be determined based on a 24 hour cycle. The methods may comprise adjusting a storage time depending on energy demand, e.g., adjusting a storage time of the recovered residual energy so that a combined electrical output of the top and bottom cycle heat engines meets a fluctuating demand, a baseline demand, and/or a peak demand.

A power plant may therefore "time-shift" electrical generation by accumulating residual heat from a top-cycle heat engine and using that residual heat in a bottom-cycle heat engine at a different time of day or at night, for instance. A power plant may also incorporate thermal energy storage in other areas of the power plant. For instance, a thermal energy storage unit may accumulate heat that is used to power a top-cycle heat engine and release that heat on demand to continue producing electrical energy from a top-cycle heat engine, thus supplementing or replacing a primary heat source (such as natural gas) that is used to power the top cycle heat engine. In one instance, a thermal energy storage unit for a top cycle heat engine stores thermal energy at a temperature between 800 C and 1200 C.

The methods may be used to produce electricity at high efficiency, e.g., with a combined efficiency from the top and bottom cycle heat engines of about 60% or greater, about 65% or greater, about 70% or greater. In some cases, the capacities and/or efficiencies between the top and bottom cycle heat engines may be substantially matched.

These methods may employ a variety of schemes to increase a combined efficiency of the top and bottom cycle heat engines. For example, there may be a plurality of top cycle heat engines operating in parallel and employing the same thermodynamic cycle (e.g., multiple Brayton cycle turbines), and the methods may comprise accumulating and storing residual energy from some or all of the engines in the set and using the accumulated stored residual energy to drive a large and efficient single bottom cycle heat engine, which may be a Rankine cycle heat engine. In the methods in which residual energy from multiple top cycle heat engines (e.g., multiple Brayton cycle heat engines) is accumulated, a combined efficiency of at least about 65% or even higher may be achieved.

As stated above, electrical power plants are also disclosed here. In general, the electrical power plants comprise one or more top cycle heat engines configured to generate electrical energy, one or more bottom cycle heat engines configured to generate electrical energy, and one or more mediating thermal energy storage units configured to store residual thermal energy recovered from the top cycle heat engines so that the stored residual thermal energy from the top cycle heat engines may be used to operate one or more bottom cycle heat engines. A top cycle heat engine may comprise a Brayton cycle heat engine (e.g., a heavy duty gas turbine or an aero-derivative gas turbine); a bottom cycle heat engine may comprise a Rankine cycle engine, for example.

Thus, in some variations, the top cycle heat engine may comprise a first compressor configured to compress a first working fluid, a first heating stage for heating the compressed working fluid, and a first turbine configured to expand the first working fluid to drive a first generator. Any suitable energy source may be used to power the first high temperature heating stage in the top cycle heat engine, e.g., solar energy from a linear Fresnel solar thermal array, a high concentration central receiver type solar thermal array (e.g., a multi-tower solar array), a parabolic dish solar thermal array, fossil fuel, biomass-derived fuel, or any combination thereof.

A bottom cycle heat engine may comprise a Rankine cycle heat engine in fluid communication with a heat exchanger to convey waste heat from the top cycle into the bottom cycle working fluid, most frequently water, and a second turbine. The second turbine is configured to expand the second working fluid to drive a second generator. The second working fluid may be solely heated with the stored thermal energy recovered from a top cycle heat engine, or additionally use a supplemental energy source such as solar energy, fossil fuel, biomass-derived fuel, or any combination thereof. In some of the latter variations of plants, the second turbine may comprise multiple expansion turbines for sequentially expanding the second working fluid. A reheating stage may or may not be provided to reheat the working fluid between successive expansions. If used, a reheating stage may be powered by stored thermal energy obtained from a top cycle heat engine, solar energy, fossil fuel, biomass-derived fuel, or any combination thereof.

In some plants, there will be a plurality of top cycle heat engines operating in parallel, (e.g., Brayton cycle heat engines), and the mediating thermal energy storage unit or units may be configured to accumulate and store thermal energy obtained from each engine in the set.

The mediating thermal energy storage unit of the plants described herein may comprise any suitable configuration and thermal energy storage medium. For example, a thermal energy storage medium may employ, depending on the temperature range, a thermal energy storage medium comprising an aggregate, rock, sand, concrete, a molten salt, solid metal oxide, solid metal nitride, or a combination thereof.

Further, characteristics and/or settings of any combination of the first and bottom cycle heat engines and mediating thermal energy storage unit may be selected so as to increase an overall collection efficiency of a combined cycle system. In some instances, the top and bottom cycle heat engines may exhibit a combined efficiency of about 60% or higher, about 65% or higher, about 70% or higher.

The plants may be configured for a variety of electrical energy supply roles. For example, the plants may be configured as a load following plant, e.g., a solar powered load following plant. Variations of the plants may be configured to supply a baseline amount of electrical energy or peak amounts of electrical energy.

Certain variations of the plants may comprise thermal energy storage units in addition to the mediating thermal energy storage unit used to store residual thermal energy garnered from the top cycle heat engines. Thus, one or more thermal energy storage units may be employed to store heat in excess of that needed to power the top cycle heat engines at a temperature suitable for powering one or more top cycle heat engines at a later time. Excess thermal energy obtained from a liquid or gaseous stream discharged by a top cycle heat engine can be retained in the mediating thermal storage unit.

Power plants disclosed herein may comprise additional features related to the supply of energy used to heat a working fluid for use in a top and/or a bottom cycle heat engine. For example, the plants may comprise a receiver configured to absorb reflected solar radiation from one or more reflectors, and the receiver may, in turn, heat a first working fluid directly, or heat a working fluid to indirectly heat the first and/or second working fluid through heat exchange. Variations of these receivers may comprise a refractory core which is configured to absorb incident solar energy and store the resultant thermal energy so as to dampen short duration fluctuations in solar energy incident radiation. The receivers may comprise one or more fluid channels in and/or around the core, through which a working fluid may be conveyed to extract stored thermal energy from the core. Alternatively the receiver may use absorbing filament structures (volumetric receivers) to heat incoming air or gas before the air is compressed and passed to a top cycle heat engine.

The power plants may have any layout or configuration. For example, the power plant receiver may be mounted on a tower, and an array of reflectors (e.g., 1 or 2 axis heliostats) may be used to direct concentrated solar radiation to the receiver. If one or more of the top cycle heat engines is a Brayton cycle heat engine, for example, a compressor of the engine may also be mounted on a tower. In other variations, the receiver may be mounted at or near ground level. In these circumstances, the power plant may comprise a reflector configured to receive solar radiation from an array of reflectors (e.g., heliostats) and redirect that reflected solar radiation down to the receiver.

Thus, electrical power plants described here may comprise means for compressing a top cycle working fluid, means employing solar energy for effecting heating of the top cycle working fluid following its compression, a first turbine coupled to a first means for generating electrical energy and through which the first working fluid is in operation expanded to drive the first generating means, and thermal energy storage means arranged to store residual thermal energy contained in the first working fluid following its expansion through the first turbine. In some electrical power plants, a second turbine may be coupled to a second means for generating electrical energy and arranged to receive a heated second working fluid that in operation is expanded through the second turbine to drive the second generating means. A heat exchanger in thermal communication with the thermal energy storage means transfers heat from the storage means to the second working fluid.

For example, certain of the electrical power plants described herein may comprise a compressor stage for compressing a first working fluid, a heating system (e.g., a solar powered heating system) for effecting heating of the first working fluid following its compression, a first top cycle turbine coupled to a first electrical generator and through which the first working fluid is in operation expanded to drive the first electrical generator, a thermal energy storage system arranged to store residual thermal energy contained in the first working fluid following its expansion through the first turbine, and a second bottom cycle turbine coupled to a second electrical generator and arranged to receive a heated second working fluid that in operation is expanded through the second turbine to drive the second electrical generator, and wherein heating of the second working fluid is in operation effected by use of the stored thermal energy within the thermal energy storage system.

The application will be more fully understood from the following description including examples of methods of generating electrical energy and examples of combined cycle power plants, the description being provided with reference to the accompanying drawings.

DETAILED DESCRIPTION

Figure 1:
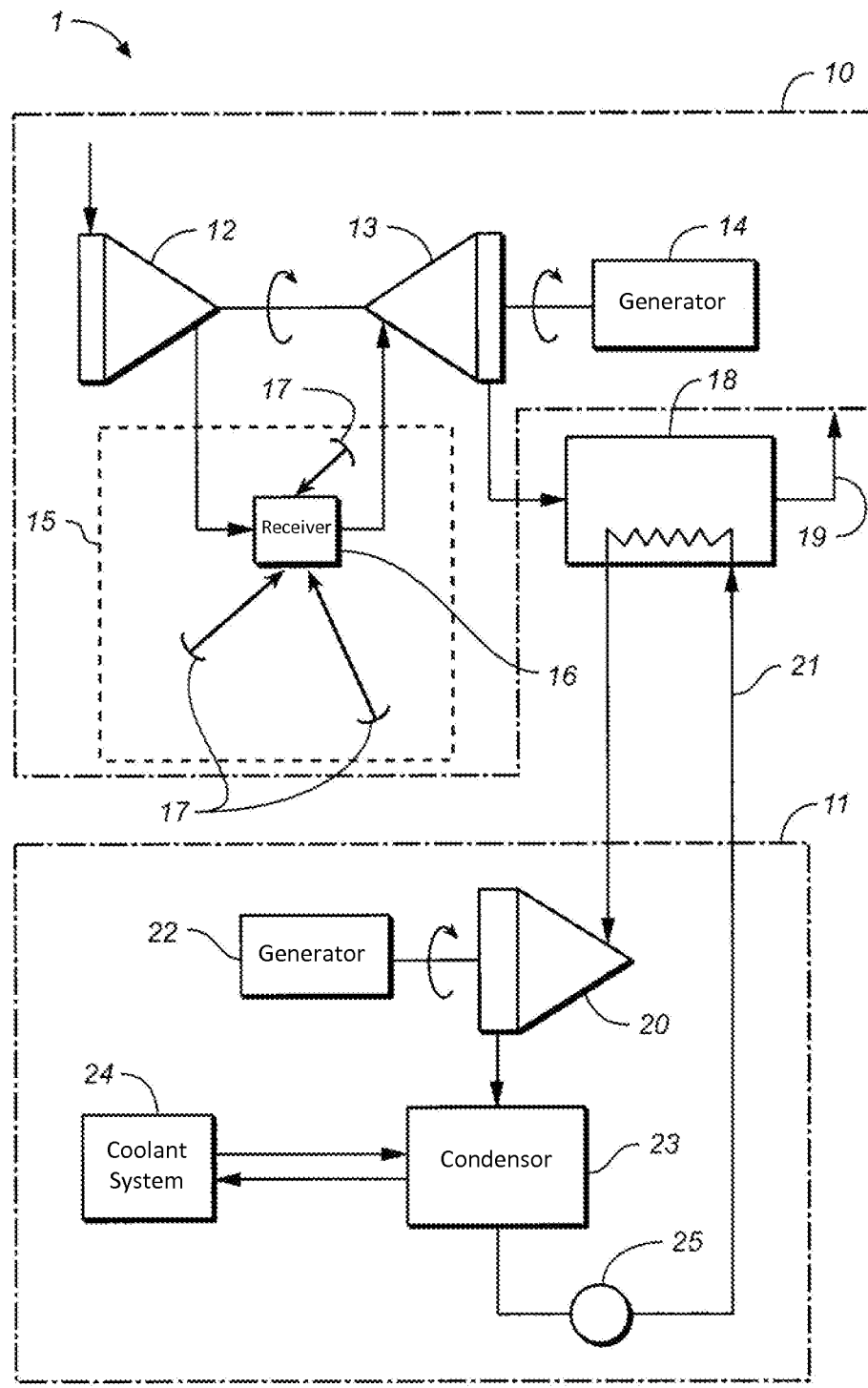
FIG. 1 shows a block-diagrammatic representation of elemental components of a variation of a combined cycle power plant.

In general, the methods and related combined cycle power plants disclosed here use a mediating thermal energy storage system between heat engines employing two different thermodynamic cycles, so that residual or waste thermal energy may be recovered from a process stream such as steam exiting equipment employing the top cycle and stored before use in one or more heat engines employing one or more bottom cycles. The energy generating methods and related combined cycle power plants may be applied to any two cycle energy generating system in which residual energy recovered from a process stream involved in the top cycle is used as an energy source to drive the heat engine employing a bottom cycle.

For example, combined cycle power plants are described herein that comprise a gas turbine employing a Brayton cycle, a mediating thermal energy storage unit configured to store residual thermal energy recovered from the Brayton cycle gas turbine so that the stored thermal energy may be used to heat a second working fluid (e.g., steam) in a Rankine engine. An industrial Brayton cycle engine such as a heavy duty gas turbine or an aeroderivative (et engine) Brayton cycle gas turbine may be used.

In the methods and power plants disclosed herein, heating of the second working fluid in the bottom cycle by use of the stored thermal energy (and consequential activation of the second turbine) may be effected at times selected to meet power supply requirements. Thus, the methods and power plants described herein, in various embodiments, may be employed to provide for the meeting of transient changes in load demand or, with an appropriate level of thermal energy storage, to provide for extended power delivery. Thus, the power plants may be configured as load following power plants, to supply a baseline amount of energy, to supply peak demand for energy, or any combination thereof.

It should also be noted that the terms "a" "an" and "the" are meant to encompass singular as well as plural referents unless the context clearly indicates otherwise. Numerical ranges as used herein are meant to be inclusive of any endpoints indicated for the ranges, as well as any number included in the ranges. As used herein, "primarily" is intended to mean at least about 50%. A "top cycle" or "top thermodynamic cycle" is a thermodynamic cycle having, for instance, a first temperature range. A "bottom cycle" or "bottom thermodynamic cycle" is a thermodynamic cycle having, for instance, a range of temperatures lower than the range of temperatures for the top cycle. Heat remaining in a process stream that has exited e.g. a turbine or other equipment producing electricity and employing a top cycle can be utilized in e.g. a turbine or other equipment employing a bottom cycle to produce electricity.

For convenience and clarity only, combined cycle power plants and methods for generating electrical energy are described below in two separately labelled sections. This organization of the detailed description is not meant to be limiting in any way. For example, any of the features described in connection with combined cycle power plants may be employed in the methods for generating electrical energy.

I. Electrical Power Plants

Disclosed herein are electrical power plants. In general, the power plants are combined cycle power plants. That is, they comprise a first heat engine employing a top cycle and configured to generate electrical energy, and a second heat engine employing a bottom cycle and configured to generate electrical energy using residual thermal energy recovered from a process stream such as hot air or steam of the first heat engine. The combined cycle power plants described here also comprise a mediating thermal energy storage unit configured to accumulate and/or store the residual thermal energy that is recovered from the process stream before such residual thermal energy is used by the second heat engine.

The energy source used to power the heat engine employing a top cycle in the power plants may comprise for example solar energy, a fossil fuel and/or a biomass-derived fuel. In certain variations, more than one energy source may be used to power the heat engine, e.g., solar energy in combination with a fossil fuel. The first working fluid may be directly heated by the energy source, or may be indirectly heated via heat exchange. If solar energy is used to drive a heat engine employing a top cycle, that solar energy may be collected using any type of high temperature solar energy collector system, e.g., solar energy from a high concentration central receiver type solar thermal array (e.g., a multi-tower solar array), or a parabolic dish solar thermal array, a linear Fresnel reflector solar thermal array, or a parabolic trough solar array.

It should be pointed out that the amount of residual thermal energy recovered from a process stream involved in the top cycle that is stored may be varied from plant to plant, or in a certain plant as operational needs are changed. For example, in some cases, all the residual energy from a process stream involved in the top cycle may be stored in the mediating thermal energy storage unit. In other cases, part of the residual energy from the process stream of the top cycle may be stored in the mediating thermal energy storage unit, and part of the residual energy may be used immediately in one or more of the heat engines employing a bottom cycle. In certain situations, the mediating thermal energy storage unit may be bypassed, so that all of the recovered waste energy from the process stream involved in a top cycle is conveyed to the heat engine employing the bottom cycle for immediate use.

Heating the second working fluid by use of the stored thermal energy (and consequential activation of the second turbine) may be effected at times selected to meet power supply requirements, including during periods of insolation, during periods extending beyond periods of insolation and/or at times occurring between periods of insolation. The combined cycle power plants, in various embodiments, may be employed to provide for the meeting of transient changes in load demand, or with an appropriate level of thermal energy storage, to provide for extended power delivery.

Thus, through the use of stored thermal energy recovered from the process fluid employed in the top cycle, and optionally, the direct use of thermal energy recovered from the process fluid employed in the top cycle, the combined cycle power plants may be configured to meet a variety of electrical power needs, e.g., as load following plants, to supply a baseline amount of electrical energy, and/or to supply electrical energy to meet peak power needs. Further, as described in more detail herein, the overall efficiency of the combined cycle power plants may be adjusted by varying an amount of waste energy that is stored, varying a storage time in the mediating thermal energy storage unit, and/or by accumulating and storing waste energy from several heat engines employing one or more top cycles to be used in a single heat engine employing a bottom cycle.

In some power plants, one or more of the heat engines of a top cycle may be a Brayton cycle, e.g., an industrial Brayton cycle engine (a heavy duty gas turbine for instance) or an aeroderivative Brayton cycle engine. Thus, the engine employing a top cycle of the combined cycle power plants may comprise a first compressor configured to compress a first working fluid, a first heating stage for heating the compressed first working fluid, and a first turbine configured to expand the first working fluid to drive a first generator.

The heat engine employing a bottom cycle may in some variations be a Rankine cycle engine. In those cases, the heat engine employing a bottom cycle may comprise a second turbine through which a heated process stream passes. Stored thermal energy extracted from the mediating thermal energy storage unit may be used as one energy source to heat the second working fluid in the second heating stage. Other energy sources may be used in the second stage in addition to the stored thermal energy, e.g., non-stored waste thermal energy recovered from the top cycle, solar energy, fossil fuels and/or biomass-derived fuels.

Some variations of combined cycle power plants may comprise a first heat engine employing a Brayton cycle and a second heat engine employing a Rankine cycle. Thus, the power plants comprise a first compressor stage for compressing a first working fluid, a heating system, which may in some cases incorporate a solar energy collector system, for effecting heating of the first working fluid following its compression, and a first turbine coupled to a first electrical generator and through which the first working fluid is in operation expanded to drive the first electrical generator. These power plants further comprise a mediating thermal energy storage system arranged to store residual thermal energy contained in the first working fluid following its expansion through the first turbine, and a second turbine coupled to a second electrical generator and arranged to receive a heated second working fluid that in operation is expanded through the second turbine to drive the second electrical generator. Heating of the second working fluid is in operation effected at least in part by the use of the stored thermal energy within the mediating thermal energy storage system.

In the combined cycle power plants, the working fluids employed in the top and bottom cycles may be any suitable working fluids. When the top cycle is a Brayton cycle, the first working fluid may comprise any stable, non-combustible gas that is suitable for expansion through a gas turbine. For example, the first working fluid may comprise primarily air, e.g., when, as will normally (but not necessarily) be the case, the first working fluid is directed through an open loop system and exhausted to the atmosphere.

The second working fluid may optionally comprise a hydrocarbon fluid or other fluid that is suitable for expanding through a turbine (i.e., the second turbine). In some cases, the second working fluid comprises steam, water, or a water mixture, e.g., a steam/water mixture, depending on the second working fluid's location within the equipment employed in a bottom cycle. When in the form of water or a steam/water mixture, the second working fluid may normally be heated to a temperature in a range from about 200° C. to about 400° C., or from about 300° C. to about 400° C., although higher and lower temperatures are feasible, e.g., temperatures from about 700° C. to about 800° C. Also, as is discussed in more detail herein, the second turbine may optionally comprise a multi-stage turbine arrangement, and the second working fluid, in being transported between the stages, may be directed through a reheating stage, that may in some instances be powered at least in part by thermal energy extracted from the mediating thermal energy storage system.

The mediating thermal energy storage system used in the combined cycle power plants disclosed here may optionally comprise any (solid, liquid, or solid plus liquid) thermal energy storage medium, including one that incorporates a material that changes phases reversibly with absorption and liberation of thermal energy (latent heat storage), and one that stores heat as primarily as sensible heat. In certain variations, a thermal energy storage medium used with the power plants may comprise an aggregate, a powder, a solid mass of a thermal energy storage material, and/or a liquid. The first working fluid that contains the residual thermal energy following expansion may be placed in physical and/or thermal contact with a thermal energy storage medium, or may be carried in one or more pipes that are in thermal contact with a thermal energy storage medium. Non-limiting examples of thermal energy storage materials that may be used include rocks comprising minerals such as quartz, aggregates, sand, concrete, one or more molten salts (e.g., a nitrate salt, a hydroxide salt, a carbonate salt, and/or a sulphate salt), and combinations thereof. Thermal energy storage materials used in the mediating thermal energy storage units may be selected to have certain thermal properties such as heat capacity, thermal diffusivity, and/or thermal conductivity. For example, an energy storing capacity of a thermal energy storage unit may be tuned by adjusting a thermal mass of the thermal energy storage medium by adjusting its composition and/or size, and a time constant for storage and release of heat may be adjusted by selecting the thermal diffusivity and/or thermal conductivity of one or more thermal energy storage materials, as well as a size, shape and configuration of a thermal energy storage medium.

As stated above, in another possible embodiment, the thermal energy storage systems may comprise an aggregation of thermally conductive materials, for example conductive earthen materials or a mixture of conductive earthen materials and metal, with which the first working fluid is in thermal contact, e.g., by channelling the first working fluid through the aggregation (with or without a conduit to convey the working fluid) following its expansion through the first turbine. Some examples of thermal energy storage systems comprising aggregated media are provided in U.S. patent application Ser. No. 12/135,124, entitled "Granular Thermal Energy Storage Mediums and Devices for Thermal Energy Storage Systems", filed concurrently herewith, which is incorporated herein by reference in its entirety.

If a liquid is used as a thermal energy storage medium, any suitable tank configuration for containing that liquid may be used, e.g., a thermocline thermal energy storage system or a two-tank thermal energy storage system, as is known. In certain variations, a liquid may be combined with a solid to form a thermal energy storage medium, e.g., rocks, stones, sand and the like may be placed in a bath of molten salt to form a thermal energy storage system.

In some combined cycle power plants, e.g., those in which the first working fluid comprises water and/or steam, and the thermal energy storage system may comprise water that is maintained (under pressure) in its liquid phase in subterranean storage vessels such as those disclosed in Australian Provisional Patent Application Nos. 2006903801 and 2006905367, dated Jul. 14, 2006 and Sep. 28, 2006, respectively, and International Patent Application No. PCT/AU2007/000980, dated Jul. 13, 2007, each of which is incorporated herein by reference in its entirety.

Certain variations of the power plants may comprise thermal energy storage units in addition to the mediating thermal energy storage system described above. For example, a thermal energy storage unit may be included in a plant for storing at least a portion of heat from heated compressed first working fluid in the top cycle, before expanding that fluid to generate electricity. Alternatively or in addition, a plant may comprise a thermal energy storage unit for storing at least a portion of heat from heated second working fluid in the bottom cycle before using that fluid. Thus, combined cycle power plants may be configured for storing thermal energy in the top cycle, in the bottom cycle, and/or between the first and bottom cycles. Any or all of the thermal energy storage units or systems may be employed for example to accommodate for low insolation periods if solar energy is used as an energy source, to increase a plant efficiency, and/or to adjust an output of the plant to meet a peak or baseline energy demand. These additional thermal energy storage units may comprise any thermal energy storage system as described herein, now known or later developed.

Equipment such as the heat engines employing the top and bottom cycles and mediating thermal energy storage unit may be selected and operated to e.g. increase overall collection efficiency or other performance metric of a combined cycle system, such as a peak output, a baseline output, or a fluctuation level. In some instances, the equipment employing the top and bottom cycles or the power plant incorporating them may exhibit a combined efficiency of about 60% or higher, about 65% or higher, about 70% or higher, about 75% or higher, or about 80% or higher. Thus, the power plants and related methods described here may be employed to provide high efficiency power that can meet transient changes in load demand and/or provide for extended power delivery. In certain variations, the plants may be configured as a load following plant, e.g., a solar powered load following plant.

As stated above, in some cases, solar energy may be used as an energy source in the top cycle and/or in the bottom cycle of the power plants, e.g., to heat a first and/or second working fluid used in the respective top and bottom cycles, or to reheat a working fluid in between successive expansions as described herein. Where solar energy is used as an energy source, any type of high temperature solar energy collector system may be used in connection with the power plants, e.g., solar energy from a high concentration central receiver type solar thermal array (e.g., a multi-tower or elevated solar thermal array), or a parabolic dish solar thermal array, for instance, as well as other solar thermal arrays discussed previously.

The first working fluid in the top cycle may be directly heated, or may be indirectly heated via heat exchange. For example, the first working fluid may optionally be heated by heat exchange with a further fluid that is itself heated by solar irradiation. In one embodiment, the first working fluid may be heated by heat exchange in at in least one receiver to which solar radiation is reflected from a field or multiple fields of reflectors. In a particular embodiment of the power plants, the receiver or, if more than one, each of the receivers may optionally comprise elevated (e.g. tower-mounted) or ground-mounted cavity-type receiver to which solar radiation is reflected, e.g., from a field of heliostat-type concentrating reflectors. Further, such receivers may optionally be used to indirectly heat a second working fluid via heat exchange, and may for example provide a supplemental energy source to supply heat in addition to that recovered from the top cycle and/or to heat a reheating stage in the bottom cycle, e.g., a reheating stage between expansion cycles.

In certain variations, cavity-type receivers may be configured to receive and store thermal energy. Non-limiting examples of such cavity-type receivers that may be used receive and store thermal energy are provided in U.S. patent application Ser. No. 12/157,064, entitled "Integrated Solar Energy Receiver-Storage Units", filed concurrently herewith, and which has already been incorporated herein by reference in its entirety. Heat exchange between a receiver, e.g., an integrated receiver that is capable of receiving and storing thermal energy, and a working fluid (e.g., a first working fluid) may be effected indirectly, for example by way of an intermediate heat exchange fluid. However, direct heating of the first working fluid optionally may be effected, for example by channelling the first working fluid through the receiver for absorption of thermal energy that is generated by absorption of concentrated solar energy within a solar radiation absorbing core of the receiver.

In one or more reflector fields used in a solar energy collector system used as an energy source for the power plants disclosed herein, one or more reflectors may optionally comprise any type of two-axis heliostat, including one having a fixed vertical axis, but desirably comprises one having a fixed horizontal axis, for example as disclosed in International Patent Application No. PCT/AU2008/00095, dated Jan. 29, 2008 and entitled "Solar Energy Collector Heliostats" and Australian Provisional Patent Application No. 2007900391, dated Jan. 29, 2007, each of which is incorporated by reference herein in its entirety. Also, a collision avoiding solar tracking system, for example of the type disclosed in International Patent Application No. PCT/AU2008/000096, dated Jan. 29, 2008, and Australian Provisional Patent Application No. 2007900390, dated Jan. 29, 2007, each of which is incorporated by reference herein in its entirety, may be employed for driving heliostats in a reflector field.

Also, a plurality of towers may optionally be positioned within a single field of reflectors or within each of a plurality of reflector fields. In either of these optional cases, the reflectors may be controlled and driven for orientation toward a single receiver or to be re-orientated from one receiver to another in order to optimise solar energy collection and to minimise the possibility of reflector shading. Non-limiting examples of reflectors that may be reoriented to direct incident solar radiation from one tower to another are described in U.S. Pat. No. 5,899,199 issued May 4, 1999 to David Mills, which is incorporated by reference herein in its entirety.

In one (but non-essential) embodiment of the invention, the compressor may be mounted to a tower in proximity to a tower-mounted receiver. In some variations, a first turbine and first electrical generator may also be mounted to a tower. The first working fluid may then be ducted to (or adjacent to) ground level for admission to the thermal energy storage system following its expansion through the first turbine The storage system may optionally comprise any (solid or liquid) storage medium, including one that relies at least partially on latent heat, i.e., one that changes phase reversibly with absorption and liberation of thermal energy. However, in one embodiment of the invention the storage system comprises water that is maintained (under pressure) in its liquid phase in subterranean storage vessels such as those disclosed in Australian Provisional Patent applications Nos. 2006903801 and 2006905367, dated Jul. 14, 2006 and Sep. 28, 2006 respectively, and International Patent Application No. PCT/AU2007/000980, each of which is incorporated by reference herein in its entirety. In another possible embodiment of the invention the storage system comprises an aggregation of thermally conductive materials, for example conductive earthen materials or a mixture of conductive earthen materials and metal, through which the first working fluid is channelled following its expansion through the first turbine.

Figure 2:
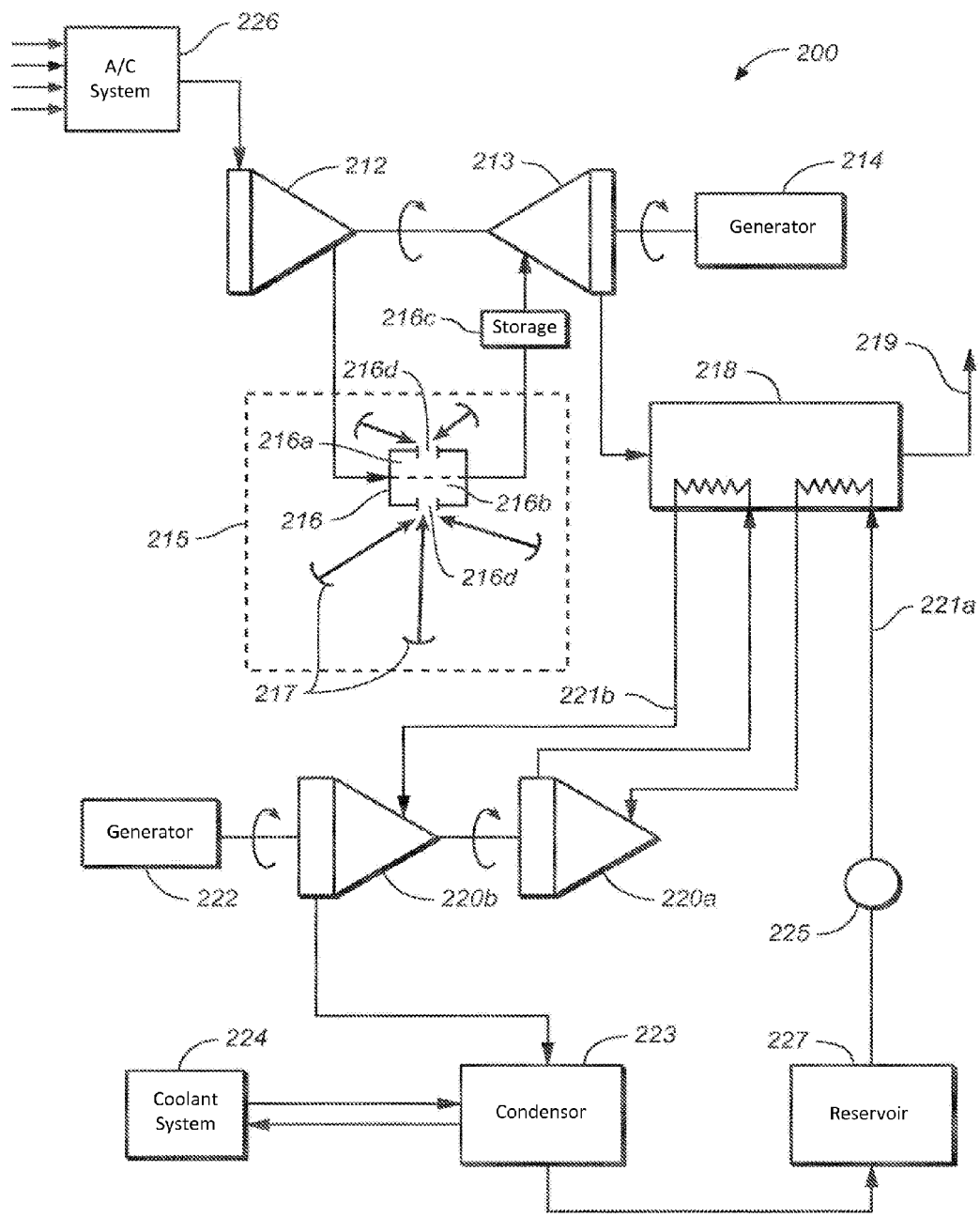
FIG. 2 shows another block-diagrammatic representation of a variation of a combined cycle power plant.

Referring now to the FIGS. 1-2, various examples of combined cycle power plants are shown. For the example illustrated in FIG. 1, the combine cycle power plant 1 comprises two interconnected power generating systems; a first of which (designated by numeral 10) employs a quasi-Brayton or quasi-isothermal Brayton top cycle and the second of which (designated by numeral 11) employs a quasi-Rankine bottom cycle.

In the particular variation depicted in FIG. 1, the heat engine employing a top cycle or system 10 comprises a turbo-compressor 12, to which a first working fluid in the form of ambient air is admitted, and a gas turbine (i.e., a first turbine) 13 which provides rotary drive to both the turbo-compressor 12 and a first electric generator 14. Following its compression the first working fluid is heated in a heating system 15 and is delivered to the turbine 13 where it expends a major part of its acquired energy by expanding through and driving the turbine 13.

The heating system 15 for the equipment employing a top cycle may, but need not, comprise a solar energy collector system as an energy source. As described above, any energy source may be used in a heating system employed in the top cycle in addition to or in place of solar energy, e.g., a fossil fuel, or a biomass-derived fuel. If a solar energy collector system is used, it may comprise one or more tower-mounted cavity-type receivers 16 to which concentrated solar radiation is reflected by a field of reflectors 17, which may be for example be any heliostats as described herein or otherwise known (e.g., fixed vertical axis heliostats or fixed horizontal axis heliostats). Only three reflectors 17 are for convenience shown in FIG. 1 but, depending upon the power output capacity of the turbine 13-generator 14 set, the field may normally comprise many hundreds of reflectors, e.g., heliostats.

Although not so shown in FIG. 1, if the receiver 16 is a tower-mounted receiver, the compressor 12, turbine 13 and first generator 14 may also be mounted on the tower as a quasi-integrated assembly on the tower. Such an arrangement may avoid or reduce the need to transport very high temperature gas from the receiver 16 to ground level where the first turbine 13 and first generator 14 might alternatively be located.

Having expanded through the gas (first) turbine 13, at least a portion of the first working fluid may be directed to a mediating thermal energy storage system 18 where residual thermal energy contained in the first working fluid is released (by heat exchange) to a thermal energy storage medium as described herein within the thermal energy storage system 18. Then, having expended all (or, at least, a majority) of its acquired energy, the first working fluid may be exhausted to the atmosphere as indicated by numeral 19. As described above, the power plants may be configured to adjust the amount of residual thermal energy that is to be stored, and the amount of recovered residual thermal energy that is to be directed to a turbine employing a bottom cycle for immediate use. Thus, a control valve (not shown) may be used to adjust an amount (if any) of the first working fluid containing residual thermal energy that may be directed to the mediating thermal energy storage system 18, and an amount (if any) that may be directed to a turbine employing a bottom thermodynamic cycle 11 for immediate use.

As indicated earlier in this specification, the thermal energy storage system 18 may employ any one of a number of storage media of a type having the capacity to absorb, retain and then release thermal energy in any desired duty cycle, e.g., a duty cycle extending over approximately 24 hours, or a different period of time.

The depicted power plant comprises a second turbine 20 (e.g., a steam turbine) through which a second working fluid is directed by way of a closed loop 21. The second working fluid comprises condensed water, saturated vapour (wet steam) and, in most variations, superheated steam, depending upon its position within the loop 21. Superheated or saturated steam is admitted to and expands through the turbine 20 and the resultant expended energy is applied to drive a second electric generator 22. Although not shown, the electrical output from the first generator 14 and the second generator 22 may each be delivered to an electricity supply grid.

Having expanded through the steam turbine 20, residual steam/vapour is delivered to a condenser 23 where sensible and latent heat is removed by a condenser coolant fluid that is recirculated through a condenser fluid coolant system 24. The condenser may comprise any one of a number of different types of condensers, including shell-and-tube condensers and direct contact condensers, but in certain variations a condenser may comprise a direct contact condenser in which coolant fluid is contacted with the second working fluid. The condenser coolant fluid cooling system may embody evaporative cooling, forced air cooling, subterranean heat exchange, or any combination thereof.

In an alternative (not illustrated) embodiment, air cooled condensing may be employed for condensing the output vapour from the turbine 20. In such case, and if the plant comprises a solar energy collector system such as that indicated by reflector field 15, a plurality of air cooled condensers may be positioned within the reflector field 15 and draw coolant air from a zone shaded by the reflectors 17. Non-limiting examples of air cooled condensers that may be used in connection with the power plants disclosed herein are provided in U.S. patent application Ser. No. 12/135,039, entitled "Convective/Radiative Cooling Of Condenser Coolant", filed Jun. 6, 2008, and U.S. Provisional Patent Application Ser. No. 60/933,574, entitled "Convective/Radiative Cooling Of Condenser Coolant", filed Jun. 6, 2007, each of which is incorporated by reference herein in its entirety.

Still referring to FIG. 1, the second working fluid in its liquid phase is delivered by a pump 25 from the condenser 23 to the thermal energy storage system 18, where stored thermal energy, and optionally a supplemental energy source, is transferred by heat exchange to the second working fluid in an amount to generate superheated steam for delivery to the steam turbine 20. Thus, first system 10 employing a top thermodynamic cycle provides at least a portion of the thermal energy required to power second system 11 having a heat engine employing the bottom thermodynamic cycle, and the thermal energy storage system 18 provides a key feature to maintain operation of the combined cycle system. That is, the thermal energy storage system 18 provides for operation of the second system 11 when, for example, the output from the first system 10 is not adequate to meet load demand or insufficient solar radiation is available to energise the first system 10 at a required level.

FIG. 2 illustrates one possible implementation or variation of a power plant such as that illustrated in FIG. 1. Ancillary equipment or features such as valves and metering devices as would normally be included in such a plant have been omitted from the drawing as being unnecessary for an understanding of the invention.

In the embodiment of the combined cycle power plant 200 illustrated in FIG. 2, the first working fluid, in the form of ambient air, is passed through an air conditioning (i.e., filtering and cooling) system 226 and is delivered to the turbo-compressor 212. Following compression, the first working fluid is heated in the heating system 215 and is delivered to the first turbine 213, through which it expands to impart rotary drive to the first turbine 213 and the coupled first generator 214.

The heating system 215 in the embodiment shown in FIG. 2 also may, but need not comprise a solar energy collector system as an energy source. Any energy source may be used in a heating system of the top cycle in addition to or in place of solar energy, e.g., a fossil fuel or a biomass-derived fuel. If a solar energy collector system is used, it may comprise one or more tower-mounted cavity-type receivers 216 to which concentrated solar radiation is reflected by a field of reflectors 217, which may be for example be any heliostats as described herein or otherwise known (e.g., fixed vertical axis heliostats or fixed horizontal axis heliostats). As in the case of the FIG. 1 embodiment, the field of reflectors 217 normally comprises many hundreds of reflectors (e.g., heliostats). In certain variations, in the interest of achieving increased ground coverage with the heliostats 217, each heliostat may comprise one having a fixed horizontal axis, for example as disclosed in Australian Provisional Patent Application No. 2007900391, dated Jan. 29, 2007 and International Patent Application No. PCT/AU2008/00095, entitled "Solar Energy Collector Heliostats" filed Jan. 29, 2008, each of which has already been incorporated by reference herein in its entirety. Under some circumstances, a collision avoiding solar tracking system of the type disclosed in Australian Provisional Patent Application No. 2007900390, dated Jan. 29, 2007 and International Patent Application No. PCT/AU2008/000096, dated Jan. 29, 2008, may be employed for driving the heliostats.

The receiver 216 in this embodiment may include a solar radiation absorbing core which comprises, e.g., is composed primarily of, fabricated from, or formed from a refractory material. The term "refractory material" is to be understood in the context of the present application as one that is substantially opaque to solar radiation and remains substantially stable (physically and/or chemically) when exposed to temperatures (for example of the order of about 800° C. to about 1200° C., or about 800° C. to about 2000° C., e.g., at least about 800° C., at least about 1000° C., at least about 1200° C., at least about 1400° C., at least about 1600° C., at least about 1800° C., at least about 2000° C. that may be established with absorption of concentrated solar radiation. Such "refractory material" may, for example, comprise a refractory metal, a ceramic, or a cermet. Refractory materials may comprise e.g. alumina, silica, carbon, magnesia, zirconia, silicon carbide, titanium carbide, tantalum carbide, chromium carbide, niobium carbide, zirconium carbide, molybdenum disilicide, calcium oxide, graphite, chromite, dolomite, magnesite, quartzite, aluminium silicate, tungsten, molybdenum, niobium, tantalum, rhenium, beryllium, and combinations thereof. The core may be formed or otherwise provided with a downwardly facing cavity 216a into which concentrated solar radiation is reflected by the reflectors 217 (e.g., heliostats). In these receivers, the core may absorb incident solar radiation, whereby the absorbed radiation is converted to thermal energy stored in the core. Thus, in certain variations, a receiver 216 may comprise passages 216b in or surrounding the core through which the first working fluid may be directed following compression to extract stored thermal energy from the core, and the heated compressed first working fluid may be subsequently admitted to the turbine 213. An aperture 216d of the cavity 216a may be substantially parallel to the ground, so as to reduce or eliminate convective thermal energy losses from the cavity 216a. Non-limiting examples of receivers comprising refractory cores that may be used in connection with such variations of power plants are provided in U.S. patent application Ser. No. 12/157,064, entitled "Integrated Solar Receiver-Storage Units,", filed concurrently herewith and U.S. Provisional Patent Application Ser. No. 60/933,574, filed Jun. 6, 2007, each of which has already been incorporated by reference herein in its entirety. The receivers may also be angled to more closely face the field if of the volumetric type.

The power plant may optionally comprise a thermal energy storage unit 216c configured to store heat from the heated compressed first working fluid before expansion, which may be integrated into (e.g., in a refractory core of receiver 216 as described above), or may be provided separately from the receiver. If a thermal energy storage unit 216c is provided, it may be any thermal energy storage system as described herein, otherwise known, or later developed. The thermal energy storage unit, if present, may be used to compensate for transient interruptions to or reductions in the delivery of solar energy to the first turbine 213.

Having expanded through the turbine 213, at least a portion of the first working fluid may be directed into and through the thermal energy storage system 218 where residual thermal energy contained in the first working fluid is released (by heat exchange) to the thermal energy storage medium within the thermal energy storage system. As described in connection with FIG. 1 above, the power plant may comprise a control valve (not shown) for adjusting an amount (if any) of the first working fluid following expansion may bypass the storage system 218 for immediate use in the bottom cycle 211. The thermal energy storage system 218 may be any suitable thermal energy storage system as described herein, otherwise known, or later developed, but in this particular embodiment may comprise a subterranean storage system that has fluid transport conduits buried in a matrix of aggregated conductive earthen material and optionally using metal fins. Examples of such thermal energy storage systems are disclosed in U.S. Provisional Patent Application Ser. No. 60/933,637, filed Jun. 6, 2007, entitled "Thermal Energy Storage System and Thermal Power Plant Incorporating Such System" and U.S. patent application Ser. No. 12/135,124, entitled "Granular Thermal Energy Storage Mediums and Devices for Thermal Energy Storage Systems", filed concurrently herewith, each of which is incorporated by reference herein in its entirety. The first working fluid may be exhausted to the atmosphere from the thermal energy storage system 218 at a relatively low temperature, as indicated by numeral 219.

In some variations, the turbine employing a bottom thermodynamic cycle may comprise multiple stages. Thus, the steam cycle system within the FIG. 2 embodiment of the power plant comprises a two-stage turbine 220a, 220b (e.g., steam turbine) through which the second working fluid is directed by way of two series-circuit loops 221a and 221b, the former of which provides a primary heating stage and latter of which incorporates an inter-turbine reheating stage. The second working fluid comprises condensed water, saturated vapour and superheated steam, depending upon its position within the loops 221a and 221b. Superheated steam is admitted to and expands through the turbine stages and the resultant expended energy is applied to drive the second electric generator 222. Although the multi-stage steam turbine in FIG. 2 is depicted as a two-stage turbine with an intervening reheating stage, any other type of multi-stage turbine may be used in the power plants described herein, e.g., a multi-stage turbine that operates without an intervening reheating stage, e.g., a three-stage turbine in which the first stage turbine is a high pressure turbine, the second stage turbine operates at reduced pressures relative to the first turbine, and the final stage turbine operates at still lower pressure.

Having expanded through both of the steam turbine stages 220a and 220b, residual steam/vapour is delivered to the condenser 223 where sensible and latent heat is removed by a condenser coolant fluid that is recirculated through a condenser fluid coolant system 224. As in the case of the FIG. 1 embodiment, the condenser may comprise any one of a number of different types of condensers but, as indicated, in some variations the condenser may comprise a direct contact condenser in which coolant fluid is contacted with the second working fluid. The condenser coolant fluid cooling system may in some instances comprise a subterranean cooling system of the type disclosed in International Patent Application No. PCT/AU2007/000268, filed Mar. 2, 2007, which is hereby incorporated herein by reference in its entirety.

The second working fluid in its liquid phase is delivered by the pump 225 from the condenser 223 to the thermal energy storage system 218 by way of a condensate reservoir 227. The reservoir 227 may accommodates fluctuations in the level of the second working fluid in the thermal energy storage system and/or provide for balancing of transport of the second working fluid throughout the water-steam circuit.

As in the case of the FIG. 1 embodiment, thermal energy that is stored in the thermal energy storage system 218 is transferred by heat exchange to the second working fluid in the primary stage and reheating stage (if present), and superheated steam is generated for delivery to the respective steam turbine stages 220a and 220b.

In certain variations of the power plants, it may be desired to generally match the amount of residual heat supplied by the first working fluid of a top cycle to the amount of heat required to run the heat engine employing a second cycle to, e.g., increase an overall efficiency of the plant. For example, in certain situations it may be desired to use a relatively high capacity Rankine cycle heat engine. Any type of Brayton cycle heat engine may be used to feed into the Rankine cycle heat engine, but in some cases it may be beneficial to use an industrial Brayton cycle engine such as a heavy duty gas turbine, as industrial Brayton cycle heat engines generally have higher capacity than aeroderivative turbines employing a Brayton cycle. However, the residual thermal energy recovered from an industrial Brayton cycle engine may have a lower temperature than that of an aeroderivative cycle. Therefore, without a mediating thermal energy storage unit to build up residual thermal energy from an industrial Brayton cycle engine, the Rankine cycle engine may require larger amounts of auxiliary fuel to generate superheated steam suitable for driving a steam turbine, which may in turn lower overall plant efficiency. However, with the plants described herein, residual thermal energy from the working fluid of the top cycle may be accumulated and built up over time in the mediating thermal energy storage unit. The amount of residual energy accumulated over time may be sufficient to generate superheated steam from an industrial Brayton cycle heat engine without the need for, or with a reduced need for, auxiliary energy sources in the heat engine employing the bottom thermodynamic cycle to produce superheated steam. Thus, the combined cycle power plants incorporating mediating thermal energy storage systems may allow coupling of a high capacity industrial Brayton cycle with a high capacity Rankine cycle, and still maintain a high overall efficiency, e.g., about 60%, about 65%, about 70%, or even higher.

Additional schemes or power plant configurations may be used to increase one or more performance parameters such as efficiency in the power plants described here. In some variations of combined cycle power plants, the top cycle may be one of a set of multiple energy generating cycles, and waste thermal energy from the set may be used to power a heat engine employing a bottom thermodynamic cycle. In these variations, the mediating thermal energy storage unit may be configured to accumulate residual thermal energy from some or all of the energy generating cycles in the set. Any or all of the energy generating cycles in the set may comprise Brayton cycles heat engines, e.g., one or more heavy duty gas turbines or one or more aeroderivative gas turbines. The energy generating cycles in the set may, but need not be, of the same type, capacity, and/or efficiency. Further, the energy generating cycles in the set may utilize the same or different energy sources, e.g., some or all may be solar powered, or driven by fossil fuel or biomass-derived fuel. The heat pump of a bottom cycle may for example comprise a Rankine cycle heat pump using steam as a working fluid as described herein. The mediating thermal energy storage unit used in these plants may be any thermal energy storage unit as described herein, otherwise known, or later developed.

Figure 3:
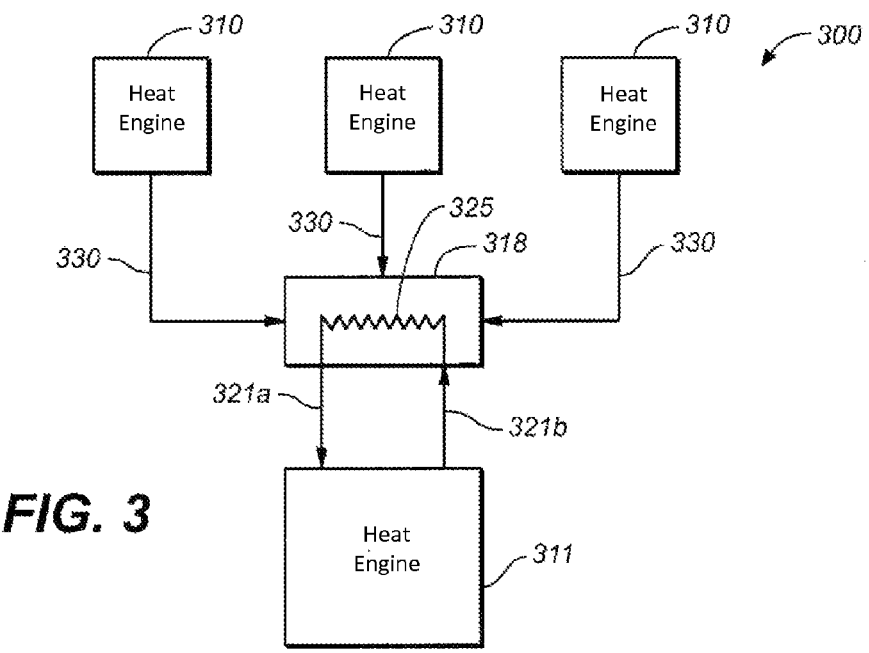
FIG. 3 illustrates yet another block-diagrammatic representation of a variation of a combined cycle power plant.

Referring now to FIG. 3, an example of a combined cycle power plant 300 is illustrated which comprises multiple first energy generating heat engines 310. The engines 310 may be any suitable heat engines, may be the same or different, and may be powered using the same or different energy sources, as described above. In some instances, the engines 310 may employ a Brayton cycle, e.g., as illustrated as heat engine 10 in FIG. 1 or heat engine 210 in FIG. 2. Each of the engines 310 may generate electricity, e.g., by expansion of a heated working fluid through a turbine coupled to a generator as described above. Residual thermal energy may be recovered from those engines, e.g., after expansion of a heated working fluid. Some or all of the recovered residual thermal energy from each engine 310 may be conveyed to a mediating thermal energy storage unit 318, as indicated by arrows 330. The thermal energy storage unit 318 may be configured to accumulate and store residual energy from some or all of the engines 310. The stored thermal energy may then be used to power a heat engine employing a bottom thermodynamic cycle 311, e.g., a Rankine cycle heat engine (e.g. turbine). In this particular variation, the heat engine 311 is depicted as a closed loop cycle in which a second working fluid (e.g., steam, water, or a steam/water mixture as described above) extracts thermal energy from the thermal energy storage unit 318 via a heat exchanger 325. The heated second working fluid may be then expanded to drive a turbine coupled to a generator.

In the combined cycle power plants as illustrated in FIG. 3, any combination of heat engines upstream from the mediating thermal energy storage unit may be used, and any downstream heat engine or engines may be used. In some cases, an overall efficiency, a peak output, or a base output of the plant may be adjusted by tuning some or all of its energy generating components. As one illustration, the combined waste heat of the heat engines 310 may be matched with energy requirements for one or more heat engines of the bottom cycle 311 to improve efficiency. For example, the set of heat engines 310 may comprise aeroderivative gas engines, and by feeding heat from multiple aeroderivative gas engines into a single Rankine cycle heat engine, the capacities of the top and bottom energy generating systems of the combined cycle power plant may be better matched, which may lead to increased overall efficiency. Further, as described above, some of the residual energy from one or more of the heat engines employing top thermodynamic cycles 310 may be used directly in one or more heat engines employing the bottom thermodynamic cycle (i.e., thermal energy storage unit 318 may be bypassed). An amount of energy that is stored in the mediating thermal energy storage unit may be varied, e.g., to tune an output of the power plant to produce a desired amount of peak or baseline power or to smooth out fluctuations such as those due to periods of low insolation for solar powered plants.

Figure 4:
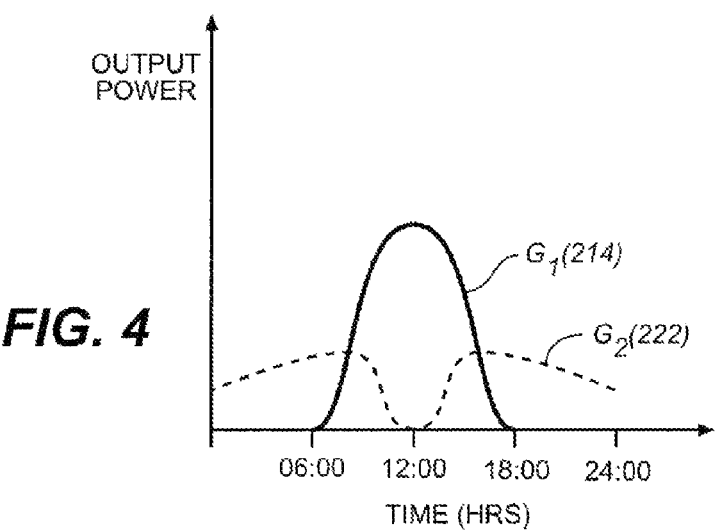
FIG. 4 shows a graph which plots illustrative power output against time for electrical generators associated with respective operating cycles of a power plant as described herein, e.g., any one of the variations illustrated in FIGS. 1-3.

FIG. 4 provides a graphical representation of the operation of a combined cycle power plant as described herein, e.g., a power plant as shown in any one of FIGS. 1-3, over a twenty-four hour period. Referring for example to power plant 200 in FIG. 2, during the daytime period from about 06:00 to 18:00, output power from the plant (indicated by solid curve $G_1(214)$) may be generated predominantly by the first generator 214 in the (Brayton cycle) gas turbine system 210, peaking during a period of maximum insolation at approximately 12:00. Energy that is stored in the energy storage system 218 during high levels of insolation may be accessed by the steam turbine system 211 during periods of low (to zero) insolation and output power from the plant may be generated predominantly by the second generator 222, as indicated by dashed curve $G_2(222)$. The output of the plant is obtained by adding the power depicted by each curve at a given time. Of course, many variations in the relative contributions of first (Brayton) cycles and bottom cycles utilizing stored thermal energy from the top cycle other than those depicted in FIG. 4 may be achieved using different power plant configurations as described herein.

II. Methods for Generating Electrical Energy

As stated above, in general the methods disclosed herein comprise generating electrical energy employing a top cycle, storing residual thermal energy recovered from a process stream used in the top cycle using a mediating thermal energy storage unit, and using the stored residual thermal energy to generate electrical energy employing a bottom cycle.

The methods may comprise using any suitable fuel or energy source in the top cycle. For example, solar energy may be used, such as solar thermal energy collected from a tower solar thermal array (e.g., a multi-tower solar array), or a parabolic dish solar thermal array. Other solar thermal arrays as discussed above may be used. Alternatively or in addition, fuels such as fossil fuels and/or biomass-derived fuels may be used in the top cycle. In certain variations, more than one energy source may be used in the top cycle, e.g., solar energy in combination with a fossil fuel. The methods may comprise indirectly heating the first working fluid via heat exchange with a working fluid that has been directly heated, e.g., by use of any one or any combination of energy sources as described above.

Certain methods may comprise storing a portion of the residual thermal energy recovered from a heat engine employing a top cycle, and diverting a portion of the residual thermal energy from a process stream of that heat engine for immediate use in a heat engine employing a bottom thermodynamic cycle. The amount of residual thermal energy that is stored versus diverted for immediate use may be controlled, e.g., depending on a degree of insolation, a time of day, a peak or baseline energy demand, or any combination thereof.

The methods may comprise generating electrical energy using any suitable combination of top and bottom electrical energy generating cycles. As stated above, the methods may comprise utilizing a Brayton cycle as a top cycle (e.g., employing a heavy duty gas turbine as an industrial Brayton cycle heat engine or an aeroderivative gas turbine as a Brayton cycle heat engine). Some methods may employ a Rankine cycle as a bottom cycle. Thus, methods may comprise compressing, heating and expanding a first working fluid through a first turbine to drive a first electrical generator in the top cycle, storing residual thermal energy contained in the first working fluid following its expansion in a mediating thermal energy storage system, and in a bottom cycle, heating a second working fluid with the stored thermal energy recovered from the top cycle, and generating electrical energy using the heated second working fluid, e.g., in a Rankine cycle. A power plant as illustrated in any one of the FIGS. 1-3 above may be used in these methods.

For the methods using a Rankine cycle as the bottom cycle, the methods comprise heating the second working fluid with stored thermal energy recovered from a process stream or working fluid of the top cycle, and expanding the heated second working fluid through a second turbine coupled to a second electrical generator. In some instances, more than one expansion turbine may be used. A power plant that may be used in these methods is illustrated in FIG. 2. Thus, the methods may include expanding the heated second working fluid through multiple expansion stages, e.g., two or more expansion turbines in sequence. In some instances, the second working fluid may be reheated between successive expansions, as illustrated for example in FIG. 2. In certain instances, methods may comprise expanding the heated second working fluid through three expansion stages, where the first expansion stage is accomplished by a high pressure turbine, and the second and third expansion stages are accomplished by successively lower pressure turbines. If a reheating stage is used between successive expansions, the methods may comprise using stored thermal energy from the working fluid employed in a top cycle for such reheating, solar energy (e.g., from a tower mounted receiver as described herein), fossil fuel, or a biomass-derived fuel.

The methods may comprise storing residual thermal energy recovered from the working fluid of the top cycle using any suitable mediating thermal energy storage system. For example, thermal energy storage systems employing a thermal energy storage medium comprising an aggregate, sand, concrete, or a combination thereof may be used. In some methods a thermal energy storage medium may comprise a molten salt. The thermal energy storage system that is used in combination with a particular combined cycle power plant can be selected based on a variety of factors, including the type of working fluid being used, a desired thermal energy storage capacity, a thermal energy storage time, a time constant for thermal energy storage and or thermal energy extraction, and/or a storage temperature. Some examples of suitable thermal energy storage systems and thermal energy storage media are described in U.S. patent application Ser. No. 12/135,124, entitled "Granular Thermal Energy Storage Mediums and Devices for Thermal Energy Storage Systems", filed concurrently herewith, which has already been incorporated by reference herein in its entirety.

The methods may comprise storing the residual thermal energy prior to use in one or more bottom cycle heat engines for any desired length of time. In some cases, the stored thermal energy may be stored on a transient basis. In these situations, the stored thermal energy may be used in the bottom cycle in a time frame close to that in which it was produced, e.g., within about 15 minutes, within about 10 minutes, or within about 5 minutes, or within about 1 or 2 minutes of the time of recovery of residual thermal energy from the working fluid employed in the top cycle. Such transient storage times may in particular be used for smoothing out fluctuations in energy supply, e.g., so that flow to a turbine is not substantially interrupted. In other cases, the stored thermal energy may be stored for more extended periods, and used in the heat engine employing a bottom cycle at a delayed time relative to the recovery of the residual energy from the top cycle's working fluid. For example, the stored thermal energy may be stored for longer than about 15 minutes, e.g., about an hour, about 2 hours, about 4 hours, or about 6 hours, or even longer, e.g., about 8 hours, or about 10 hours. In some cases, the output of each of the two cycles in the power plant may be adjusted according to a 24 hour cycle, e.g., as illustrated and discussed in connection with FIG. 4. The methods may comprise adjusting a storage time depending on energy demand and energy supply, e.g., adjusting a storage time of the recovered residual energy so that a combined output of the top and bottom cycles meets a fluctuating demand, a baseline demand, and/or a peak demand, e.g., even during periods of low insolation for a solar powered plant.

The methods may include adjusting a capacity of the heat engines employing the top and/or bottom cycles to increase overall efficiency or another performance metric for the combined cycle system. For example, the top cycle heat engine may comprise an industrial Brayton cycle engine, e.g. a heavy duty gas turbine. In these instances, the methods may comprise utilizing steam as a second working fluid in the bottom cycle, and heating that steam to a temperature below that required by most superheated steam turbines (400-500 C). In this case a lower temperature turbine similar to nuclear or geothermal designs (200 C-320 C) may be used at some cost in bottom cycle efficiency. Accumulated, stored thermal energy may then be used to drive a steam turbine employing the bottom cycle. These methods may be used in particular in instances in which it is desired to increase a capacity of the heat engines of a top cycle, or to use a lower temperature storage form. In other variations, the top cycle heat engine may comprise an aeroderivative gas turbine, which may allow heating the steam to a temperature at or above that required to use super heated steam, e.g., in a temperature range from about 700° C. to about 800° C.

The methods for generating electrical energy may utilize other thermal energy storage schemes. For example, certain methods may comprise storing at least a portion of heat from the thermal fluid used in the top cycle, before expanding that fluid to generate electricity. Thus, methods for generating energy may include any combination of thermal energy storage in the top cycle and/or before use in one or more bottom cycles. The methods may include storing heated working fluids using any appropriate thermal energy storage system, e.g., by placing a pipe manifold or a vessel in thermal contact with a thermal energy storage medium comprising aggregate, sand, concrete, a molten salt or a combination thereof, as described herein. In certain variations, the hot pressurized working fluid may be stored in a pressurized vessel that may for example be placed underground.

If solar energy is to be used to power a top cycle heat engine or as a supplementary energy source for a bottom cycle heat engine, certain methods may comprise heating the appropriate working fluid by heat exchange in at least one receiver to which solar radiation is reflected from a field or multiple fields of reflectors. Examples of power plants employing such solar heated receivers are illustrated in FIGS. 1 and 2. Although this method of heating a working fluid using solar energy is described in connection with the first working fluid, it should be understood that a second working fluid in a bottom cycle may be similarly heated, e.g., as an auxiliary energy source to supply heat in addition to that provided by residual thermal energy recovered from a process stream of the top cycle, or to heat a reheating stage between successive expansions. Thus, the first working fluid may be heated by heat exchange in at least one receiver to which solar radiation is reflected from a field or multiple fields of reflectors. However, in a particular embodiment, the receiver or, if more than one, each of the receivers may optionally comprise a tower-mounted cavity-type or volumetric receiver to which solar radiation is reflected from a field of heliostat-type solar radiation concentrating reflectors. The methods may comprise effecting heat exchange between the receiver and the first working fluid indirectly, for example by way of an intermediate heat exchange fluid. Optionally, the methods may effect direct heating of the first working fluid by the receiver, for example by channelling the fluid through the receiver for absorption of thermal energy that is generated by absorption of concentrated solar energy within a cavity of the receiver. The receiver used in these methods may be any suitable receivers, and in some instances a receiver used may comprise a refractory core that can absorb incident solar radiation and convert the radiation to thermal energy and store that thermal energy for later use, e.g., as described in U.S. patent application Ser. No. 12/157,064, entitled "Integrated Solar Energy Receiver-Storage Units", filed concurrently herewith, and already incorporated herein by reference in its entirety.

This disclosure is illustrative and not limiting. Further modifications will be apparent to one skilled in the art in light of this disclosure and such modifications are intended to fall within the scope of the appended claims. Each publication and patent application cited in the specification is incorporated herein by reference in its entirety as if each individual publication or patent application were specifically and individually put forth herein.

What is claimed is:

1. A method of generating electrical energy, the method comprising:
   employing a top thermodynamic cycle comprising the steps of:
   heating a refractory material of a receiver with a concentrated solar light beam and storing the heat in the refractory material, the refractory material being selected from the group consisting of refractory metal, ceramic, cermet, alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof;
   compressing a first working fluid;
   heating the first working fluid by passing it through the heated refractory material; and
   expanding the first working fluid in a turbine to generate electrical energy in a first generator;
   transferring at least a portion of the thermal energy from the first working fluid after expansion to a mediating thermal storage unit by passing exhaust from the turbine through the thermal storage unit to build up a store of residual thermal energy; and
   transferring the stored residual thermal energy from the mediating thermal storage unit and the stored heat in the refractory material to a second working fluid at a later time for use in a bottom thermodynamic cycle to generate electrical energy in a second generator, wherein the thermal storage unit is in the form of an aggregate, a powder, a solid mass or a liquid and comprises a material selected from the group consisting of rocks, minerals, quartz, aggregates, sand, concrete, molten salts including nitrate salts, hydroxide salt, carbonate salt, sulphate salt and combinations thereof.

2. The method of claim 1, wherein the concentrated solar light beam is produced by a high concentration central receiver type solar array or a parabolic dish solar array.

3. The method of claim 1, further comprising the step of diverting a portion of the residual thermal energy for immediate use in the bottom thermodynamic cycle.

4. The method of claim 1, further comprising the step of adjusting a storage time of the residual thermal energy so that a combined electrical output of heat engines employing the top and bottom thermodynamic cycles meets a fluctuating demand.

5. The method of claim 1, further comprising the step of adjusting a storage time of the residual thermal energy so that a combined electrical output of heat engines employing the top and bottom thermodynamic cycles meets a baseline demand.

6. The method of claim 1, further comprising the step of adjusting a storage time of the residual thermal energy so that a combined output of heat engines employing the top and bottom thermodynamic cycles meets a peak demand.

7. The method of claim 1, further comprising the step of expanding the second working fluid in multiple stages through a multi-stage turbine.

8. The method of claim 7, further comprising the step of reheating the second working fluid between expansion stages.

9. The method of claim 1, further comprising the step of transferring heat energy to the second working fluid by transfer from the refractory material, either between expansion stages or before the first expansion.

10. The method of claim 1, further comprising the step of storing at least a portion of the heated compressed first working fluid before expanding the first working fluid to produce electrical energy.

11. The method of claim 1, further comprising the step of storing at least a portion of the heated second working fluid before using the heated second working fluid to generate electrical energy.

12. The method of claim 1, further comprising the step of supplementing the top thermodynamic cycle with energy from a fossil fuel or a biomass-derived fuel.

13. The method of claim 3, wherein a degree of diversion of residual thermal energy for immediate use is configured to provide a combined efficiency from the top and bottom thermodynamic cycles of about 65% or greater.

14. The method of claim 3, further comprising the step of providing a plurality of top thermodynamic cycles and storing residual energy from the first working fluid associated with some or all of the plurality of top thermodynamic cycles and using the accumulated stored residual energy to generate electrical energy in the bottom thermodynamic cycle.

15. The method of claim 14, wherein some or all of the cycles in the plurality of thermodynamic cycles comprise Brayton cycles.

16. The method of claim 1, further comprising the step of using an industrial Brayton or Ericsson turbine in the top thermodynamic cycle.

17. The method of claim 1, further comprising the step of using an aeroderivative Brayton or Ericcson turbine in the top thermodynamic cycle.

18. The method of claim 1, further comprising the step of using a Rankine or Kalina cycle as the bottom thermodynamic cycle.

19. An electrical power plant comprising:
   a solar concentrator for concentrating a solar light beam;
   a receiver comprising a refractory material for receiving the concentrated solar light beam and converting the concentrated solar light beam to heat energy and storing the heat energy, the refractory material being selected from the group consisting of refractory metal, ceramic, cermet, alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof;
   a first top cycle heat engine employing a top thermodynamic cycle configured to generate electrical energy, the first top cycle heat engine comprising:
   a first compressor configured to compress a first working fluid;
   a first heating stage for heating the compressed first working fluid via the refractory material; and
   a first turbine configured to expand the first working fluid to drive a first generator;
   a mediating thermal energy storage unit configured to store residual thermal energy recovered from the expanded first working fluid of the first top cycle heat engine by passing exhaust from the first turbine through the thermal storage unit;
   a heat exchange apparatus operable to transfer heat from the heat stored in the refractory material and the mediating thermal energy storage unit to a second working fluid;

a first bottom cycle heat engine employing a bottom thermodynamic cycle and configured to generate electrical energy using the second working fluid heated by the stored thermal energy in the refractory material and the mediating thermal energy storage unit, wherein the thermal storage unit is in the form of an aggregate, a powder, a solid mass or a liquid and comprises a material selected from the group consisting of rocks, minerals, quartz, aggregates, sand, concrete, molten salts including nitrate salts, hydroxide salt, carbonate salt, sulphate salt and combinations thereof.

20. The electrical power plant of claim 19, wherein the first bottom cycle heat engine comprises:
a second compressor configured to compress the second working fluid;
a second heating stage for heating the compressed second working fluid; and
a second turbine configured to expand the second working fluid to drive a second generator.

21. The electrical power plant of claim 20, wherein the second turbine comprises multiple expansion stages.

22. The electrical power plant of claim 21, further comprising a reheating stage configured to reheat the second working fluid between expansion stages.

23. The electrical power plant of claim 19, wherein the first top cycle heat engine is one of a plurality of top cycle heat engines, and the mediating thermal energy storage unit is configured to accumulate and store thermal energy from some or all of the plurality of heat engines.

24. The electrical power plant of claim 23, wherein some or all of the heat engines in the plurality of to cycle heat engines employ a Brayton cycle.

25. The electrical power plant of claim 19, wherein the first top cycle heat engine comprises an industrial gas turbine.

26. The electrical power plant of claim 19, wherein the first top cycle heat engine comprises an aeroderivative gas turbine.

27. The electrical power plant of claim 19, wherein the first bottom cycle heat engine comprises a Rankine or Kalina cycle turbine.

28. The electrical power plant of claim 19, configured to output electrical energy at an efficiency of about 65% or higher.

29. The electrical power plant of claim 19, configured as a load following power plant.

30. The electrical power plant of claim 19, configured to supply a baseline amount of electrical energy.

31. The electrical power plant of claim 19, configured to supply peak amounts of electrical energy.

32. The electrical power plant of claim 19, wherein the heat exchange system is provided to facilitate transfer of heat from the receiver core or the thermal storage unit to the second working fluid between expansion stages in the first bottom cycle heat engine.

33. The electrical power plant of claim 19, wherein the first top cycle heat engine is configured to be heated with a fossil fuel or a biomass-derived fuel.

34. The electrical power plant of claim 19, wherein the receiver comprises a refractory core configured to store the thermal energy converted from the concentrated solar light beam.

35. The electrical power plant of claim 34, wherein the core further comprises one or more fluid channels in and/or around the core to convey a working fluid to facilitate extraction of stored thermal energy from the core.

36. The electrical power plant of claim 19, wherein the receiver is tower mounted.

37. The electrical power plant of claim 36, wherein the receiver and the first compressor are tower mounted.

38. The electrical power plant of claim 19, further comprising an elevated reflector configured to reflect concentrated solar radiation to the receiver, itself mounted on the ground.

39. An electrical power plant comprising a compressor to compress a first working fluid,
a solar concentrator to form a concentrated light beam,
a receiver comprising a refractory material for converting solar radiation from the concentrated light beam into heat and storing the heat to effect heating of the first working fluid following its compression, the refractory material being selected from the group consisting of refractory metal, ceramic, cermet, alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof,
a first turbine coupled to a first electrical generator for generating electrical energy, wherein the first working fluid in operation expands through the first turbine to drive the first electrical generator,
a thermal energy storage unit arranged to store residual thermal energy contained in the first working fluid following its expansion through the first turbine by passing exhaust from the first turbine through the thermal storage unit,
a second turbine coupled to a second electrical generator and arranged to receive a second working fluid that in operation is expanded through the second turbine to drive the second generator, and
wherein the second working fluid is in operation heated by use of stored thermal energy extracted from the thermal energy storage unit and the refractory material of the receiver, wherein the thermal storage unit is in the form of an aggregate, a powder, a solid mass or a liquid and comprises a material selected from the group consisting of rocks, minerals, quartz, aggregates, sand, concrete, molten salts including nitrate salts, hydroxide salt, carbonate salt, sulphate salt and combinations thereof.

* * * * *